US012354432B2

(12) United States Patent
Alderucci et al.

(10) Patent No.: US 12,354,432 B2
(45) **Date of Patent: *Jul. 8, 2025**

(54) GAME WITH PLAYER ACTUATED CONTROL STRUCTURE

(71) Applicant: CFPH, LLC, New York, NY (US)

(72) Inventors: Dean P. Alderucci, Westport, CT (US); Geoffrey M. Gelman, Brooklyn, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,351

(22) Filed: Jul. 11, 2023

(65) Prior Publication Data

US 2023/0351838 A1 Nov. 2, 2023

Related U.S. Application Data

(63) Continuation of application No. 17/245,472, filed on Apr. 30, 2021, now Pat. No. 11,749,051, which is a continuation of application No. 16/683,706, filed on Nov. 14, 2019, now Pat. No. 10,997,815, which is a continuation of application No. 11/742,054, filed on Apr. 30, 2007, now Pat. No. 10,504,317.

(51) Int. Cl.
*G07F 17/32* (2006.01)

(52) U.S. Cl.
CPC ................................ *G07F 17/3209* (2013.01)

(58) Field of Classification Search
CPC .. G07F 17/32; G07F 17/3206; A63F 3/00157; G06F 3/017; G06F 3/0346
See application file for complete search history.

(56) References Cited

U.S. PATENT DOCUMENTS

| | | | | |
|---|---|---|---|---|
| 6,261,179 | B1 | 7/2001 | Miyamoto et al. | |
| 2007/0072680 | A1 | 3/2007 | Ikeda | |
| 2007/0259717 | A1* | 11/2007 | Mattice | G06F 3/0346 463/36 |
| 2008/0076528 | A1* | 3/2008 | Nguyen | G07F 17/3218 463/25 |
| 2008/0146344 | A1* | 6/2008 | Rowe | G07F 17/32 463/42 |
| 2008/0196945 | A1* | 8/2008 | Konstas | G06F 3/03547 178/18.03 |
| 2009/0098925 | A1* | 4/2009 | Gagner | G07F 17/32 463/20 |
| 2009/0137312 | A1* | 5/2009 | Walker | G07F 17/3262 463/20 |
| 2009/0170596 | A1* | 7/2009 | Gagner | G07F 17/32 463/25 |
| 2009/0191946 | A1* | 7/2009 | Thomas | G07F 17/3209 463/20 |

FOREIGN PATENT DOCUMENTS

| | | | |
|---|---|---|---|
| JP | H10295940 | 11/1998 | |
| JP | 2002288063 | 10/2002 | |
| JP | 2007083013 | 4/2007 | |
| JP | 2014169188 | 9/2014 | |
| WO | WO-2007022256 A2 * | 2/2007 | G07F 17/32 |

* cited by examiner

*Primary Examiner* — William H McCulloch, Jr.
*Assistant Examiner* — Ankit B Doshi

(57) ABSTRACT

In various embodiments, motion is used to control games played on a mobile gaming device.

18 Claims, 13 Drawing Sheets

GAME WITH PLAYER ACTUATED CONTROL STRUCTURE

CROSS REFERENCE TO RELATED APPLICATIONS

This patent application is a continuation of U.S. patent application Ser. No. 17/245,472 filed Apr. 30, 2021, which is a continuation of U.S. patent application Ser. No. 16/683,706 filed Nov. 14, 2019 (now U.S. patent Ser. No. 10/997,815 issued May 4, 2021), which is a continuation application of U.S. patent application Ser. No. 11/742,054 filed Apr. 30, 2007 (now U.S. Pat. No. 10,504,317 issued Dec. 10, 2019), each of which is incorporated by reference herein in its entirety.

BRIEF DESCRIPTION OF THE FIGURES

FIG. 11(*b*) is a flow diagram of a particular method of using the portable gaming device by a player, according to some embodiments.

DETAILED DESCRIPTION

Figure 1:
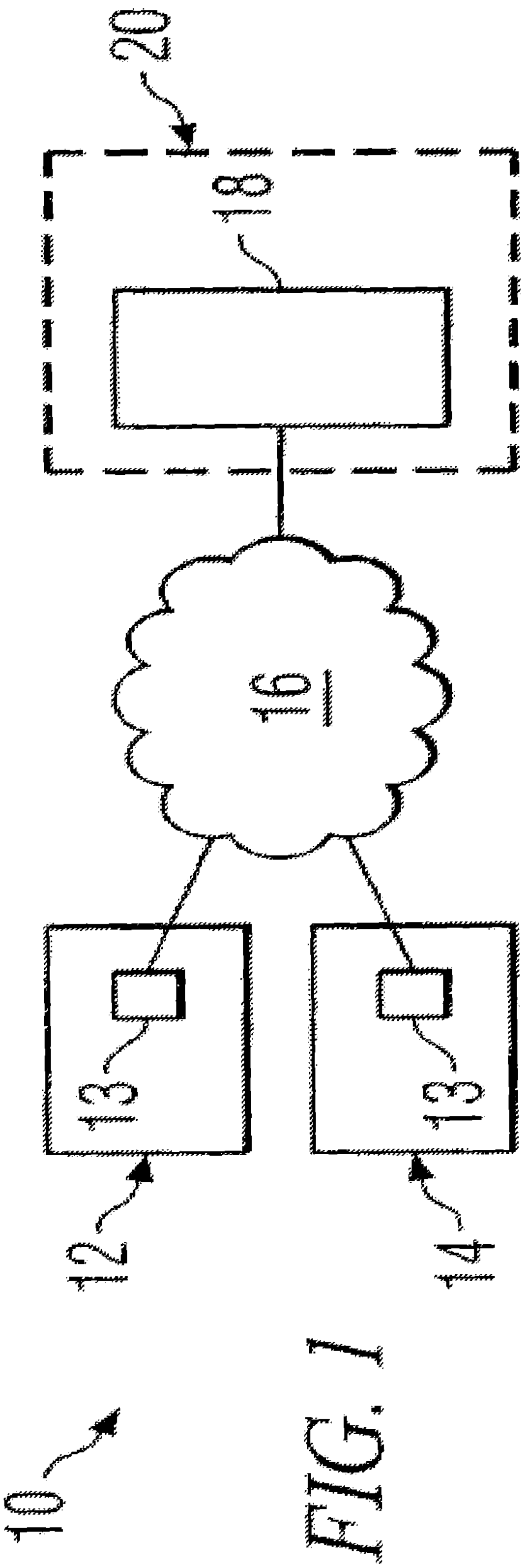
FIG. 1 shows a gaming system according to some embodiments.

In some embodiments, a gaming device, such as a mobile gaming device, receives inputs in the form of motion. For example, a human holding a mobile gaming device may make commands or provide instructions by tilting the device, moving the device in some direction, rotating the device, shaking the device, hitting the device against something, tossing the device, or providing any other motion-based inputs to the device. The motions may translate to one or more commands or instructions used in a game. The motions may also translate to commands or instructions or requests used for other purposes, e.g., beyond the play of a game. Commands, instructions, requests, and specifications may include: (a) an instruction to place a bet; (b) a specification of the size of a bet; (c) an instruction to begin a game; (d) an instruction to pursue a particular strategy in a game; (e) an instruction to hold a particular card in a game of video poker; (f) an instruction to hit in a game of blackjack; (g) an instruction to cash out; (h) an instruction to switch games; (i) a specification of a particular type of game to play; (j) an instruction to make a particular selection in a bonus round; (k) a request to order a drink; (1) a request to order food; (m) an instruction to summon a casino representative; (n) a request to redeem comp points; (o) a request to receive a comp benefit; (p) an instruction to open up a line of communication with another person (e.g., with a friend who is also in a casino); (q) an instruction to make a withdrawal from an account (e.g., from a bank account); (r) an instruction to fund an account (e.g., to fund an account a player has with a casino with gaming credits); (s) a request to make a purchase; (t) a request to purchase show tickets; (u) an instruction to make a reservation at a restaurant; (v) a request for information; (w) a request for information about a pay table (e.g., about the payouts on a pay table); (x) a request for a location of a particular room; (y) a request to check into a hotel room; (z) a request to reserve a hotel room; (aa) a request to check on show times; (ab) a request to claim a jackpot; (ac) a request to make a phone call; (ad) a specification of a phone number; (ad) a request to access a network; (ae) a request to access the Internet; (af) a specification of a Web or URL address; (ag) a request to receive information about another player; (ah) a request to see information about a game outcome of another player; (ai) a request to see information about the gaming history of another player; (aj) a request to receive information about one or more players, dealers, gaming devices, or game tables (e.g., a request to see the most recent outcomes for any of the aforementioned); and any other request, instruction, command, or specification. The mobile gaming device may include hardware and/or software for detecting motions. The mobile gaming device may work in conjunction with external hardware or software for detection motions. The mobile gaming device or another device may include software for translating motions detected into instructions that can be used in conducting a game or in any other fashion.

Herein, "motion control" may include using motion as an input to a game, using motion as a command, and/or using motion as instructions. Motion control may include using the motion of a mobile gaming device to provide inputs to the games played on the mobile gaming device, to select games to play, to indicate a player's desire to cash out, or to provide various other instructions or indications.

1. TECHNOLOGIES. Various technologies may be used to enable motion control. Such technologies may include technologies for sensing motion, including such information as acceleration, velocity, angular motion, displacement, position, angular displacement, angular velocity, angular acceleration, impact shocks, and any other information that may be associated with motion. Technologies may include sensors, including hardware sensors. Technologies may also include software for translating information received from sensors into information about the position, trajectory, or other spatial information about a mobile gaming device. For example, software may be used to translate acceleration information into position information, e.g., through double integration. Various technologies may or may not be described in the following references, each of which is hereby incorporated by reference herein: (1) United States Patent Application 20040046736 "Novel man machine interfaces and applications"; (2) United States Patent Application 20030100372 "Modular entertainment and gaming systems"; (3) U.S. Pat. No. 7,058,204 "Multiple camera control system"; (4) U.S. Pat. No. 5,534,917 "Video image based control system"; (5) United States Patent Application 20060281453 "ORIENTATION-SENSITIVE SIGNAL OUTPUT"; (6) United States Patent Application 20060098873 "Multiple camera control system"; (7) U.S. Pat. No. 6,850,221 "Trigger operated electronic device"; (8) United States Patent Application 20070072680 "Game controller and game system"; (9) United States Patent Application 20070066394 "VIDEO GAME SYSTEM WITH WIRELESS MODULAR HANDHELD CONTROLLER"; (10) United States Patent Application 20070050597 "Game controller and game system"; and (11) United States Patent Application 20070049374 "Game system and storage medium having game program stored thereon".

1.1. CAMERA IN THE DEVICE. A camera on the mobile gaming device may capture images. As the mobile gaming device moves, different images will likely be captured by the camera. Stationary objects may appear to move between the images captured in successive frames. From the apparent motion of the stationary objects, the motion of the mobile gaming device may be inferred.

1.2. EXTERNAL CAMERAS. External cameras, such as stationary wall-mounted cameras, may film the mobile gaming device and/or the player holding the mobile gaming device. From footage of the mobile gaming device, algorithms may infer the motion of the mobile gaming device.

1.3. EXTERNAL READERS (E.G., RANGE FINDERS). External sensors or readers may detect the motion of the mobile gaming device. For example, ultrasound waves or lasers may be bounced off the mobile gaming device. From changes in the reflected sound or light, the motion of the mobile gaming device may be inferred.

1.4. ACCELEROMETERS. A mobile gaming device may include built-in accelerometers. These may detect changes in velocity, which may be used to infer other aspects of motion, such as change in position or velocity.

1.5. GYROSCOPE SENSORS. A mobile gaming device may contain internal gyroscopes. These may detect an orientation of the mobile gaming device. Information from a gyroscope may be used to infer other information, such as angular displacement.

1.6. POSITION DETECTORS INTERNAL (GPS). A mobile gaming device may include position detectors, such as sensors for a global positioning system or for a local positioning system. Position, when measured over time, may be used to infer other aspects of motion, such as velocity or acceleration.

1.7. POSITION DETECTORS EXTERNAL. External detectors may measure the position of a mobile gaming device. For example, the mobile gaming device may emit a signal in all directions. Based on the time it takes the signal to reach various fixed detectors, the position of the mobile gaming device may be inferred.

1.8. RFID. DETECT AS THE SIGNAL STRENGTH OF AN RFID GETS STRONGER OR WEAKER. A mobile gaming device may contain a radio frequency identification (RFID) tag or other radio frequency emitting device. Based on the reception of the signal from the RFID tag, information about the position of the mobile gaming device may be inferred. For example, if the signal received is weak, it may be inferred that the mobile gaming device is far from a fixed receiver. If the received signal is strong, it may be inferred that the mobile gaming device is near to the fixed receiver.

2. SWITCH FOR MOTION COMMANDS. ENABLE SWITCH FOR THE MOTION COMMAND. PRESS MOTION BUTTON, AND WHILE PRESSED, MOTION WORKS. COULD BE A CONSTANT COMMAND OR TOGGLE ON OR OFF TO MAKE THE COMMAND BE IN FORCE. TO ENABLE THAT YOU'RE IN MOTION CONTROL MODE, YOU COULD GO THROUGH ALL THESE MOTIONS. In various embodiments, motion control may alternately enabled or disabled. At some times motion control may be in use, while at other times motion control may not be in use. For example, at a first time the motion of a mobile gaming device may cause decisions to be made in a game, while at a second time the motion of a mobile gaming device may not have any effect on a game. When motion control is enabled, a player may be able to conveniently engage in game play. When motion control is off, a player may move a mobile gaming device inadvertently without worrying that such movement will affect a game. Thus, there may be reasons at various times to have motion control enabled, and reasons at various times to have motion control disabled.

2.1. TOGGLE ON AND OFF. In various embodiments, a player must provide continuous, substantially continuous, or persistent input in order to maintain the enablement of motion control. Continuous input may include continuous pressure, such as the continuous pressing and holding of a button. Continuous input may include continuous squeezing of buttons or of the device (e.g., the mobile gaming device) itself. In some embodiments, continuous input may include repeated pressing of a button such that, for example, each button press occurs within a predetermined time interval of the previous button press. In various embodiments, continuous input may include continuous contact. For example, to maintain the enablement of motion control a player must maintain a finger or other appendage in constant contact with a touch sensitive device (e.g., on the mobile gaming device). In various embodiments, a continuous input may require the player to continuously supply heat, such as body heat through contact. In various embodiments, continuous input may require the player to continuously supply a fingerprint, e.g., through keeping a finger in continuous contact with fingerprint reader. In various embodiments, continuous input may include continuous noise or sound generation, e.g., continuous humming by the player.

So long as a player provides a continuous input, the player may be able to move the mobile gaming device or some other device in order to control action in a game or to otherwise provide commands, instructions or other inputs. For example, to provide an input using motion, a player may press a button on a mobile gaming device and, while the button is pressed, move the mobile gaming device around. Should the player let go of the button, the motion of the mobile gaming device would cease to be used as an input. Should the player then resume pressing the button, the player may once again use the motion of the mobile gaming device as an input.

In various embodiments, a continuous input may be provided to the mobile gaming device, e.g., when the player holds a button on the mobile gaming device. In various embodiments, a player may provide continuous input to another device. For example, the player may hold down a foot pedal. The foot pedal may be in communication with the mobile gaming device, either directly or indirectly, or the foot pedal may be in communication with another device which would be controlled by the motion of the mobile gaming device. Thus, based on whether the foot pedal is pressed, a determination may be made as to whether the motion of the mobile gaming device will be used to control a game or to provide other input.

In some embodiments, a continuous input from the player is necessary to disable motion control. In the absence of the continuous input (e.g., if a button is not pressed), the motion of the mobile gaming device will be used to control a game or to provide other direction.

2.2. CONSTANT COMMAND. In various embodiments, a single input, set or inputs, or an otherwise limited set of inputs may switch motion control on or off. For example, a player may press a button to switch motion control on. The player may press the same button again to switch motion control off. As another example, a player may flip a switch one way to switch motion control on and may flip the switch the other way to switch motion control off. As another example, a player may select from a menu an option to enable motion control. The player may later select another option from the menu to disable motion control.

Once motion control has been enabled (e.g., with a single press of a button), the motion of the mobile gaming device may be used to control a game or to provide other directions. No further input to enable motion control may be required beyond the initial flipping of a switch or pressing of a button, for example.

2.2.1. MOTION CONTROL GOES OFF WHEN: In some embodiments, motion control may be automatically disabled under certain circumstances. For example, when the player has selected from a menu an option to enable motion control, motion control may remain enabled until some triggering condition occurs which will cause motion control to be automatically disabled.

2.2.1.1. NO MOTION FORA WHILE. If, for some period of time, there has been no motion, no significant motion, no detectable motion, and/or no motion that is translatable into a coherent instruction, then motion control may be automatically switched off. Motion control may be automatically switched off after 30 seconds, for example.

2.2.1.2. DEVICE LOWERED OR PUT IN POCKET. If a mobile gaming device has been lowered then motion control may be disabled. For example, it may be presumed that a player has put down a mobile gaming device and is no longer playing the mobile gaming device, therefore motion control may be disabled automatically. If a mobile gaming device has been placed in a player's pocket, motion control may be disabled automatically. If, for example, the sensors in the mobile gaming device no longer detect light, and/or detect proximate body heat, motion control may be disabled.

2.2.2. KEYBOARD LOCKING TO AVOID SWITCHING ON MOTION CONTROL ACCIDENTALLY. In various embodiments, a key, switch, or other input device may be manipulated (e.g., pressed) in order to enable motion control. It is possible, in some embodiments, that a player would inadvertently press a button or otherwise manipulate an input device so as to enable motion control. In various embodiments, a keypad of a mobile gaming device may be locked. For example, the player may press a key or sequence of keys that lock the keypad so that the same input devices which would enable motion control are temporarily non-functional. In various embodiments, only the input devices that could be used to enable motion control are disabled.

2.3. In various embodiments, an alert is provided when motion control is enabled. For example, a mobile gaming device may beep, buzz, or emit a tone when motion control is enabled. A text message may be displayed, lights may flash, or other visual alerts may be output when motion control is enabled. In various embodiments, a voice output may be used to alert a player that motion control is enabled.

In various embodiments, an alert may indicate that motion control has been disabled. The alert may take the form of text, flashing lights, audio, voice, buzzing, vibrating, or any other form.

3. USE OF VERY PRECISE OR DEFINITIVE MOTION FOR IMPORTANT THINGS (WHERE MONEY IS ON THE LINE), AND LESS PRECISE MOTION FOR LESS IMPORTANT THINGS. THIS WAY, ACCIDENTS LIKE "BET MAX" ARE AVOIDED. ALSO, CERTAIN BETS, LIKE "BET MAX" ARE NOT ALLOWED WHEN MOTION IS ON. In various embodiments, the nature or degree of motion required to provide an instruction may depend on the nature of the instruction itself. Some instructions may require a motion encompassing relatively small displacements, small accelerations, small changes in angle, and/or other small changes. Other instructions may require a motion encompassing relatively large displacements, relatively large accelerations, relatively large changes in angle, or relatively large amounts of other changes. What constitutes a large displacement, acceleration, change in angle, or other change may be defined in various ways, e.g., by some threshold. Thus, for example, a displacement of more than six inches may be considered large or at least may be considered sufficient for one type of instruction. Some instructions may require motions with a large number of repetition or a long sequence of motion (e.g., the device is moved up then down, then side to side, then up again). Some instructions may require motions with little repetition or with a small sequence of motion (e.g., up then down).

3.1. SIZE OF BET. The nature of motion required may depend on the size of a bet placed. For a player to place a large bet (e.g., a bet greater than a certain threshold amount), the player may be required to use motions encompassing large displacements, accelerations, changes in angle, and or other large changes. For a smaller bet, the player may use motions encompassing smaller changes. In various embodiments, the degree of motion may not itself specify the size of a bet. For example, making a motion encompassing a large displacement may not in and of itself specify that a bet should be $25. The specification of a bet may still require a precise sequence of motions, such as one motion for each digit describing the bet, or such as one motion for each credit bet. However, a large bet may require that each of the motions used be more expansive or more emphasized than what would be required with a smaller bet. What constitutes a large bet may vary and may include any bet that is greater than some threshold, such as $10. Further, there may be multiple thresholds of bets, with each threshold requiring a more emphatic or expansive set of motions.

3.2. SIZE OF POTENTIAL PAYOUT. The nature of motion required may depend on the size of a potential payout. For example, a player may be engaged in a game of video poker and may receive an intermediate outcome comprising five cards. If the intermediate outcome includes four cards to a royal flush, the player may have a large potential payout should he complete the royal flush. Accordingly, when the player selects cards to keep and/or cards to discard, expansive or emphatic motion may be required. If the intermediate outcome does not make a large payout likely, then less expansive or emphatic motions may be required for the player to choose discards. In various embodiments, a mobile gaming device, casino server, or other device may determine whether or not a large payout is possible and/or the probability of a large payout. Based on the size of the payout, the probability of the payout, and/or the possibility of the payout, the nature of the motion required to make a decision in a game may be varied.

3.3. MAKING A SUBOPTIMAL DECISION. In various embodiments, the motion required to make an optimal decision may be less than that required to make a suboptimal decision. For example, to make a blackjack decision that maximizes a player's expected winnings may require a relatively small displacement, while to make another decision may require a large displacement. In various embodiments, a mobile gaming device, casino server, or other device may determine a strategy that maximizes a player's expected winnings, that maximizes a potential payout for the player, or that maximizes some other criteria for the player. The mobile gaming device may accept relatively less expansive motions which provide instruction to follow the best strategy, while the mobile gaming device may require relatively more expansive motions if such motions correspond to an instruction to follow a strategy other than the best strategy.

4. CALIBRATION SEQUENCE, TUTORIAL. MAY BE REQUIRED SO YOU CAN'T LATER CLAIM THAT YOU DIDN'T MEAN TO MAKE A BET. In various embodiments, a player may go through an exercise to calibrate a mobile gaming device to his way of providing motion. Each player may be unique. For example, each player may have arms of a different length, hands of a different size, different body mechanics, different muscle strengths, and other differences which may affect the way a player moves a mobile gaming device. Thus, a player may go through a process of training the mobile gaming device to recognize the individual player's motions. In various embodiments, the mobile gaming device may guide the player through a sequence of steps in order to calibrate the mobile gaming device. The mobile gaming device may provide the player with instructions, e.g., using the screen display of the mobile gaming device or using voice prompts.

4.1. MAKE A MOTION X TIMES. OK, THIS WILL BE HOW YOU BET. In various embodiments, the mobile gaming device may instruct the player to make a particular motion. Exemplary instructions may include: "move the mobile gaming device up"; "move the mobile gaming device up 6 inches"; "move the mobile gaming device down"; "move the mobile gaming device left"; "move the mobile gaming device right"; "tilt the mobile gaming device left"; "tilt the mobile gaming device right"; "rotate the screen of the mobile gaming device towards you"; "shake the mobile gaming device"; "tap the mobile gaming device against something". The mobile gaming device may instruct the player to make a sequence of motions. Exemplary instructions may include: "move the mobile gaming device up and then to the right;" "move the mobile gaming device up, then down, then up again;" "tilt the mobile gaming device left and move it left." The mobile gaming device may instruct the player to perform a given motion one or more times. For example, the mobile gaming device may instruct the player to perform a given motion five times. When the player performs a motion multiple times, the mobile gaming device may have more data with which to establish an "average" motion or an expected range of motion which will be used to correspond to a given instruction. In various embodiments, a player may be asked to repeat the same motion several times in succession. In various embodiments, a player may be asked to perform a number of different motions such that certain motions are repeated, but not necessarily right after one another. Throughout the process of a player making motions (e.g., while holding the mobile gaming device), the mobile gaming device or another device may record data about the motions. For example, the mobile gaming device may record the amount of displacement, the amount of acceleration, the speed, the time taken to complete a motion, the amount of angular rotation, and/or any other aspects of the motion. In the future, the mobile gaming device or other device may associate similar data with the same motion. For example, if a player was asked to move a mobile gaming device in a particular way and if data was recorded about the way in which the player actually did move the mobile gaming device, then it may be assumed that if similar data is received in the future then the player has again tried to move the mobile gaming device in the same particular way. In various embodiments, certain motions from the player may not be accepted. For example, the mobile gaming device may have software with inbuilt expectations about what an "up" motion should be. If the mobile gaming device has asked the player to move the mobile gaming device "up" and the mobile gaming device detects what it interprets as a downward motion, then the mobile gaming device may take various actions. The mobile gaming device may ask the player to please try again. The mobile gaming device may tell the player that he has not followed instructions and that he should have moved the mobile gaming device up.

4.2. TEST. In various embodiments, a player may be asked to perform a motion of his choice. The mobile gaming device may then try to identify the motion. The mobile gaming device may indicate, for example, whether the motion was up, down, to the left, etc. The mobile gaming device may indicate the instruction that the motion was interpreted as. For example, the mobile gaming device may indicate that the motion was a "discard first card" instruction or that the motion was a "spin reels" motion. After a mobile gaming device indicates its interpretation of a motion, the player may confirm whether or not the mobile gaming device was correct. For example, the player may press a "correct" or "incorrect" button on the mobile gaming device. If the mobile gaming device has incorrectly identified one or more player motions, then the player may be asked to go through a process of training, e.g., an additional process of training. In various embodiments, training may continue until the mobile gaming device can successfully identify all player motions and/or all player instructions (e.g., until the mobile gaming device is correct on 50 straight trials).

4.3. TUTORIAL. In various embodiments, a training session or tutorial may be geared towards a player. The mobile gaming device, another device, or a human (e.g., a casino representative) may show the player which motions to use for various instructions. For example, the mobile gaming device may tell the player to tilt the mobile gaming device twice to the left to discard the first card in a game of video poker. The player may then be asked to try the motion one or more times. At some point, a player may be tested as to his understanding of which motions perform which commands. The player may be asked to do various things, such as to initiate a game, such as to make a "double down" decision in blackjack, such as to cash out, or such as any other thing. In various embodiments, the player may be required to repeat the tutorial and/or may be prevented from gaming using motion control until he passes a test of his knowledge of which motions perform which instructions. Passing may include, for example, providing accurate motions for all 10 things one is asked to do. In some embodiments, a player may be required to take a game-specific tutorial and/or to pass a game-specific test prior to playing a particular game. The game may require specialized motions and it may therefore be prudent for the player to take a tutorial on such motions. Absent taking a game-specific test or tutorial, a player may still be allowed to play other games.

4.4. SIGN OR OTHERWISE VERIFY YOU WENT THROUGH THE TUTORIAL. In various embodiments, a player may be asked to confirm or verify that he completed a tutorial, such as a tutorial which instructs the player on what motions to use for particular instructions. The player may confirm by providing a biometric reading (e.g., by touching his thumb to a touchpad), by signing something (e.g., by signing the screen of his mobile gaming device with a stylus), by recording a voiced statement to the effect that he has completed the tutorial, or by providing any other confirmation.

4.5. MOTION AIDS CAN BE TURNED ON OR OFF. FOR EXAMPLE, LITTLE ARROWS ON THE SCREEN EXPLAIN HOW TO MOVE THE DEVICE TO MAKE VARIOUS BETS. BUT AS YOU GET USED TO THESE, YOU CAN TURN THE ARROWS OFF. In various embodiments, a player may be provided with various aids or hints during a game, the aids telling the player how to provide certain instructions. For example, text displayed on the screen of a mobile gaming device may tell the player what motion to make to "hit," what motion to make to "stand," and so on. In a game of video poker, a voice may be emitted from the mobile gaming device telling the player how to discard the first card, how to discard the second card, and so on. For example, the voice may say, "tilt the device forward to discard the third card." In another example, arrows may appear showing the player how to move the device to provide a particular instruction. For example, an arrow pointing left that is superimposed on a card may tell the player to tilt the device left in order to discard the card. In various embodiments, the aids or hints may be turned on or off by the player. An inexperienced player may wish to have the aids on. However, eventually the player may become so familiar with the motion control that the player may wish to turn off the aids. The mobile gaming device may then no longer provide hints or aids as to what motions to make in order to provide a particular instruction. In some embodiments, hints or aids may appear automatically or by default, such as when a player first begins playing a new type of game (e.g., such as when the player first starts playing video poker). In some embodiments, the default setting is not to have aids.

4.6. CUSTOMIZE MOTIONS. I WANT X TO MEAN Y. THESE CAN BE COMPLICATED SETS OF INSTRUCTIONS. In various embodiments, a player may customize the motions that will correspond to various instructions. The mobile gaming device may take the player through a calibration sequence where the mobile gaming device asks the player what motion he would like to make to correspond to a given instruction. The player may be asked to make the motion some number of times, such as a fixed number of times or such as a number of times needed in order for the player to establish a consistency of motion or for the mobile gaming device to extract the essential parameters of the motion. The calibration sequence may proceed through one or more instructions until the player has created a motion corresponding to each. In various embodiments, each instruction may correspond to a default motion. The player may have the opportunity to change the default motion to another motion that better suits his preferences. In various embodiments, a player may wish for a motion to correspond to a sequence of instructions, e.g., a long or complicated sequence of instructions. For example, the player may wish for a single motion to correspond to the following sequence: (1) bet $5; (2) initiate a game of video poker; and (3) automatically choose discards in accordance with optimal strategy. The motion may be a motion where the player shakes the mobile gaming device twice, for example. Thus, in various embodiments, a simple motion may be used to execute a lengthy or complicated set of instructions. This may allow a player to conveniently perform desired sequences of actions.

5. THERE MAY BE CONFIRMATION. A DISPLAY MAY SAY, "YOU HAVE MOTIONED TO BET 10." In various embodiments, following a motion made by a player (e.g., following the player moving the mobile gaming device), a confirmation or an interpretation of the player's motion may be output. The mobile gaming device or another device may make such a confirmation. The mobile gaming device may display a message on its display screen indicating how the player's motion has been interpreted. For example, the mobile gaming device may display a message indicating that the player has instructed that a bet of 10 be placed on a game. The mobile gaming device may also output a message in the form of audio (e.g., using synthetic voice) or in any other format. The player may have the opportunity to view the message and to take action if he believes his motions have been misinterpreted as the wrong instructions. For example, the mobile gaming device may output an audio message using synthetic voice. The audio message may say, "You have chosen to stand. Shake the mobile gaming device if this is not your intention." The player may have some limited period of time in which to take an action to prevent the mobile gaming device from carrying out the misconstrued instruction. If the player takes no action, the instruction that has been construed by the mobile gaming device may be carried out. The player may also have the opportunity to confirm an interpretation of his motion and, for example, to thereby cause his instructions to be executed more quickly. For example, the player may shake a mobile gaming device once to confirm an interpretation of the player's prior motion by the mobile gaming device, and to thereby allow the mobile gaming device to execute the player's instruction.

5.1. THERE MAY BE VERIFICATION. A PERSON MUST MOTION AGAIN TO COMPLETE A BET. In some embodiments, a player must confirm an interpretation of a motion before his instruction will be executed. In some embodiments, a person must repeat a motion one or more times (e.g., the player must provide the same instruction two or more times) before the instruction will be carried out. In some embodiments, higher levels of verification may be required for instructions with greater consequence, such as instructions to bet large amounts or such as instructions provided when a player has the potential to win a large payout. For example, a player may have 3 seconds to stop a mobile gaming device from executing its interpretation of an instruction to bet $50, but only 1 second to stop a mobile gaming device from executing its interpretation of an instruction to bet $5.

6. MOTION TO VERIFY PLAYER IDENTITY. FOR EXAMPLE, EACH PLAYER MAY MOVE A DEVICE IN A UNIQUE WAY. In various embodiments, the motion of a mobile gaming device or other device may be used as a biometric or as a way to presumably uniquely identify a person. It may be presumed, for example, that each person has a different way in which they would move a mobile gaming device. Software within a mobile gaming device or within another device may capture motion data (e.g., using accelerometers, gyroscopes, cameras, etc.). The software may then determine salient features or statistics about the motion. For example, the software may determine a degree of curvature or loopiness to the motion, a maximum acceleration, a maximum speed, a total displacement, a presence of vibrations, and/or any other characteristics of the motion. When a player attempts to verify his identity by supplying a motion sample (e.g., by moving a mobile gaming device), software may compare his newly supplied motion to a motion previously supplied by the purported player. If the motions match (e.g., if the values of salient features of the motion are the same within some confidence interval), then the player may be presumed to be who he says he is. Having confirmed his identity, a player may be granted certain privileges, such as the right to engage in gaming activities using the mobile gaming device.

6.1. ENTER A PASSWORD WITH MOTION. A PASS-SEQUENCE OF MOTIONS. In various embodiments, a player may enter a password using a set of motions. A password may comprise, for example, a sequence of directional motions, such as "up," "down," "left," and "right." A password may consist of 7 such motions, for example. A player may use such a password to verify his identity, for example. Having provided a correct password, a player may be granted certain privileges, such as the right to engage in gaming activities using the mobile gaming device.

7. STANDARD MOTION USED ACROSS MULTIPLE GAMES. In various embodiments, two or more games may receive similar instructions. For example, two or more games may each receive similar instructions as to how much a player wishes to bet. In various embodiments, a given motion may have the same interpretation (e.g., may convey the same instruction or set of instructions) across multiple games. A player may thereby need to learn to use certain motions only once yet be able to play many games using those motions.

7.1. In various embodiments, a set of standards may be developed, where such standards indicate what motions are to correspond to what instructions. Games that conform to such standards may be labeled as such. For example, a game that accepts a certain set of motions for standard instructions in the game may be associated with a claim that says, "Conforms to Motion 5.0 Standards" or some similar claim. In various embodiments, there may be multiple different standards. A given game may be capable of accepting motions according to multiple different standards. In various embodiments, a player may choose which standard he wishes for a game to employ. For example, a player may have learned to use motions based on a first standard and so may indicate that a game should use the first standard in interpreting his motions as opposed to using a second standard.

7.2. CASHOUT. An instruction which may be common to two or more games is an instruction to cash out. Such an instruction may correspond to a standard motion, such as shaking the mobile gaming device up and down twice.

7.3. QUIT A GAME. An instruction which may be common to two or more games is an instruction to quit the game. Such an instruction may correspond to a standard motion.

7.4. INITIATE A GAME. An instruction which may be common to two or more games is an instruction to initiate or start play of the game. Following such an instruction in a slot machine game, for example, the reels (or simulated reels) may begin to spin. Following such an instruction in a game of video poker, for example, an initial set of five cards may be dealt. Such an instruction may correspond to a standard motion, such as tapping the mobile gaming device against something.

7.5. MAKING A BET. Instructions which may be common to two or more games may include instructions to specify a bet size. One common instruction may be an instruction to increment a bet by one unit or one credit. Such an instruction would, for example, increase a bet from $3 to $4, or a bet from $0.75 to $1.00. One common instruction may be an instruction to increment a bet by a fixed monetary value, such as by 1 quarter or by one dollar. With instructions available to increment bets, a player may specify a bet size by repeatedly incrementing a bet until it reaches the desired size. In various embodiments, instructions to decrement a bet may also be available and may also be standardized. An exemplary such instruction may include an instruction to reduce a bet size by one credit.

7.5.1. NUMERALS. In various embodiments, a bet size may be specified with numerals. Standard instructions based on motions may be available for specifying numerals. For example, a first motion may correspond to the number "1", a second motion may correspond to the number "2", and so on.

7.6. REPEAT LAST ACTION. An instruction may include an instruction to repeat a prior action, such as the last action performed. For example, if the player has just used a first motion to instruct a mobile gaming device to discard the first card in a hand of video poker, the player may use a second motion to instruct the mobile gaming device to repeat the last instruction (i.e., the instruction indicated by the first motion), and to apply the last instruction to the second card in the hand of video poker. In various embodiments, an instruction may include an instruction to repeat a prior game. The instruction may indicate that the amount bet and the number of pay lines played from the prior game should be repeated with the current game. Instructions to repeat a prior action, to repeat a most recent action, or to repeat a game may be common to one or more games, and thus may have standard motion associated with them.

7.7. REPEAT LAST ACTION FROM THIS SITUATION. An instruction may include an instruction to repeat an action from a similar situation in the past. For example, if a player is playing a game of blackjack, the player may provide an instruction to make the same decision that he had made in a previous game in which he had the same point total and in which the dealer had the same card showing. Such an instruction may be associated with a motion. Such a motion may be standardized across two or more games.

7.8. MOTION GENERATES RANDOM NUMBERS. In some embodiments, motion is used to generate one or more random numbers used in a game. For example, readings from various sensors on the mobile gaming device may be captured when the mobile gaming device is moving. Such readings may be converted into numbers (e.g., using some algorithm). The numbers may, in turn, be used in an algorithm for generating a game outcome. In some embodiments, numbers generated by motion are used as the only input to an algorithm for generating an outcome. In some embodiments, numbers generated from the motion of a mobile gaming device may be paired with other numbers (e.g., with random numbers generated by a separate internal algorithm of the mobile gaming device; e.g., with a number representing a time) in order to generate the outcome of a game.

7.8.1. THE IMAGE CAPTURED IS CONVERTED INTO A RANDOM NUMBER. In some embodiments, an image captured from a camera of a mobile gaming device may be converted into a number. In some embodiments, a sequence of images captured during the motion of a mobile gaming device may be used in combination to generate a random number. For example, numbers representing pixel values may be combined using some function to arrive at a number, e.g., a random number.

7.8.2. THE POSITIONS ARE USED AS A RANDOM NUMBER. In some embodiments, the various positions (e.g., coordinates in two-dimensional or three-dimensional space) to which a mobile gaming device is moved are used to generate numbers, such as random numbers. In some embodiments, accelerations, velocities, durations of motions, paths taken, angular changes, angular accelerations, and any other aspect of motion may be used to generate numbers.

7.9. MOVE THE MOBILE GAMING DEVICE TO KEEP REELS SPINNING. WHEN YOU STOP MOVING, THE REELS STOP. In some embodiments, a player may move a mobile gaming device to draw out the duration of a game. For example, the reels in slot machine game may continue to spin as the player continues to move the mobile gaming device. The reels may stop spinning once the player has stopped moving the mobile gaming device.

8. NEW ARRANGEMENT OF GAME SYMBOLS TO MAKE MOTION CONTROL EASIER. In various embodiments, game indicia, game controls, or other visuals used in a game may be arranged on a display screen of a mobile gaming device in a way that makes it intuitive for a player to interact with such visuals. For example, a player may have available to him four possible motions: (1) tilt the mobile gaming device forward, or away from himself; (2) tilt the device left; (3) tilt the device right; and (4) tilt the device backwards, or towards himself. To make such motions intuitive to use, visuals in a game may be clearly situated in one of four areas of a display screen, namely the top, bottom, left side, and right side. A player may thus readily interact with a visual on top of the screen using a forward tilting motion, with a visual on the left side of the screen using a left tilting motion, with a visual on the right side of the screen using a right tilting motion, and with a visual at the bottom of the screen using a backwards tilting motion. In various embodiments, indicia or other visuals are displayed in an area of a display screen such that the direction of such area from the center of the display screen corresponds to a direction of motion that a player must use in order to interact with such indicia.

8.1. IN VIDEO POKER, CARDS ARE ARRANGED AROUND THE PERIPHERY OF THE SCREEN. THIS WAY, YOU CAN TILT FORWARD, RIGHT, BACK, LEFT, AND MORE CLEARLY INDICATE WHICH CARD TO HOLD. In some embodiments, the cards dealt in a game of video poker may be displayed respectively at the four corners of a display screen on the mobile gaming device, with a fifth card displayed perhaps in the center of the screen. A player may indicate that he wishes to discard a particular card by tilting the mobile gaming device towards the corner of the display screen in which the particular card is displayed. To discard the card in the center, for example, the player may move the mobile gaming device up and down. Thus, by displaying cards in an arrangement other than a linear arrangement, intuitive motion control is facilitated.

8.1.1. PENTAGONAL DISPLAY In various embodiments, a display may have the shape of a pentagon. A pentagonal display may allow for each corner of the display to be occupied by a different card in a game of video poker, for example. A player may then be able to tilt or otherwise move the mobile gaming device in the direction of one of the corners in order to hold or discard the card which is shown in that corner. In various embodiments, displays of other shapes may be used. The shape of a display may be chosen which most conveniently or intuitively corresponds to a game. In some embodiments, the hardware used for a display may itself maintain a standard form, such as a rectangular form. However, the display may simulate another display which is of a different shape. For example, a rectangular display may simulate a pentagonal display by only illuminating a pentagonal portion of the display screen.

8.2. BETTING BUTTONS MAY ALSO BE ALLOCATED AROUND THE PERIPHERY OF THE SCREEN. In various embodiments, control buttons or control-related visuals may be situated in areas of a display screen that make interaction with such buttons using motion intuitive. Control visuals may correspond to instructions that may be used in a game. Control visuals may include rectangular areas of a display screen labeled "spin," "bet max," "bet 1" "cash out". Control visuals may correspond to any other instructions. Control buttons may be clearly located, for example, near the top, bottom, left, or right side of a display screen. The player may then tilt the mobile gaming device in the same direction as is represented by the location of a control visual relative to the center of the display screen in order to convey the instruction indicated by the control visual. For example, if a control visual labeled "spin" is located on the right side of a display screen, the player may tilt the mobile gaming device to the right in order to spin the reels of a slot machine game (e.g., in order to start a new game).

8.3. BINARY SEARCH SETUP FOR PLAYING WITH MOTION. FOR EXAMPLE, THIS ALLOWS YOU TO MAKE FINE-GRAINED DECISIONS WITH LIMITED INPUTS (E.G., WITH ONLY RIGHT, LEFT, FORWARD, BACK). In various embodiments, a player may specify an instruction from a range or continuum of possible instructions using a limited set of possible motions (e.g., using only two motions, such as a motion to the left and a motion to the right). To begin with, any instruction may be possible. With each motion a player makes, the player may eliminate a portion of the instructions from consideration. For example, with each motion, the player may eliminate approximately half the remaining possible instructions from consideration. Eventually, after a sequence of motions, only a single instruction will remain. This instruction may then be executed by the mobile gaming device. In some embodiments, a set of possible instructions may be visually indicated with a list on a display screen. The player may tilt the mobile gaming device forward to select the top half of the remaining instructions on the list and may tilt the mobile gaming device backwards to select the bottom half of the remaining instructions on the list. The remaining instructions may be highlighted, or the instructions which have been eliminated from consideration may disappear. After a sequence of motions from the player, only a single instruction may remain, and may be executed by the mobile gaming device.

9. IT IS POSSIBLE TO HAVE A DEVICE THAT A PERSON DOESN'T NEED TO LOOK AT. MOTION INPUTS CAN OBVIATE THE NEED TO PRESS BUTTONS. THE DEVICE CAN BUZZ TO TELL YOU A GAME IS OVER, AND PERHAPS HOW MUCH YOU'VE WON. In various embodiments, a mobile gaming device may include a device with no display screen. The device may include speakers or other audio output devices. In various embodiments, a mobile gaming device may include a display device, but the display device may not be in use. In various embodiments, a person may play a game using motion control. The person may be informed of a game outcome via voice output from the mobile gaming device. For example, the mobile gaming device may broadcast a synthetic voice telling the player that "the player has lost" or that "the player has won $10". A player may also be informed of an outcome with other audio effects. For example, the sound of chimes may represent a win while a buzzer may represent a loss. The player may then play another game. In this way, the player may proceed to play game after game, without ever looking at the device. A player may thus play, for example, in a dark room. A player may also play while driving or while his vision is otherwise occupied.

10. YOU CAN PRACTICE THIS DEVICE WHEN YOU ARE IN THE CASINO OR EVEN AT HOME. In various embodiments, a player may use motion control on a mobile gaming device in a practice mode, a learning mode, a free play mode, or in some other mode where the player has no money at risk or where the player has a reduced amount of money at risk (e.g., as compared to normal play). The use of motion control in a practice mode may allow the player to learn how to use motion control or may alleviate reservations the player might have with regard to motion control. In various embodiments, a switch, button, or other means of selection may allow a player to switch from practice mode to real mode and/or the other way around. In some embodiments, a mobile gaming device may automatically go into practice mode when it is outside of designated or legal gaming areas, such as when it is off the casino floor. A mobile gaming device may detect its own location using positioning technologies, such as GPS, for example.

10.1. USE A VIDEO GAME CONTROLLER LIKE THE WII TO PRACTICE. In various embodiments, a device other than a mobile gaming device may be used in order to simulate the use of a mobile gaming device. For example, a device used in a computer game console may be used to simulate the use of a mobile gaming device. An exemplary such device is a controller for Nintendo's® Wii™ system which takes as inputs the motions a player makes with the controller. In various embodiments, for example, a Wii console or some other computer console may display graphics representative of casino game graphics or otherwise representative of graphics that might appear on the display screen of a mobile gaming device. The player may move the controller in the same way that he would move the actual mobile gaming device. The graphics displayed may then change as they would on an actual mobile gaming device. Thus, a player may simulate the experience of using a mobile gaming device with a controller for a computer game console. When the player later uses a real mobile gaming device in a casino, for example, the player may benefit from having practiced before.

11. CUSTOMIZE TO YOUR GESTURES. TRAIN THE DEVICE AS TO HOW EXTREME YOU WANT YOUR GESTURES. SOME PEOPLE WANT MODERATE GESTURES. OTHERS WANT TO MAKE EMPHATIC GESTURES. In various embodiments, a person may calibrate the mobile gaming device to recognize or to respond to various degrees or types of gestures. Some people may naturally make large or sweeping motions, while other people may prefer more subdued motions. A person may be asked, e.g., through prompts displayed on a mobile gaming device, to make one or more motions while holding the mobile gaming device. The mobile gaming device may note various characteristics of the motion based on sensor readings (e.g., based on readings from accelerometers stored in the mobile gaming device). For example, the mobile gaming device may note whether the motions made by the person have large or small displacements, rapid or gradual accelerations, long or short durations, and/or whether the motions made by a person have any of two alternate characteristics or have any of three or more alternate characteristics. The mobile gaming device, a casino server, or another device may then store information about the nature of a person's motions. When, in the future, the person provides motions as a means for conveying instructions, the motions may be registered or followed only if such motions matched those provided during the calibration phase. For example, if a person used large and expansive motions during calibration, the person may not be able to provide instruction using small, subdued motions.

12. EXAMPLES OF MOTIONS. Following are some exemplary instructions that may be provided in a game and/or that may be provided to a mobile gaming device. Associated with the exemplary instructions are exemplary motions of a device, such as of a mobile gaming device, that may be used by a player to indicate a desire that the instructions be carried out.

12.1. HOW TO BET. To provide an instruction to bet one credit, a player may shake the mobile gaming device once. To add an extra credit, the player may shake the mobile gaming device again. To add another extra credit, the player may shake the mobile gaming device again, and so on.

12.2. HOW TO STAND. To provide an instruction to stand in a game of blackjack, a player may tilt a mobile gaming device to the left. To provide an instruction to hit, the player may tilt the gaming device to the right. To provide an instruction to split, the player may move the gaming device down then up.

12.3. HOW TO SELECT A GAME. To select a game, a player may tilt the mobile gaming device to the right. Each time the player tilts the mobile gaming device to the right, a different game from a list of games may be highlighted. When the player's desired game is highlighted, the player may tap the mobile gaming device against something.

12.4. HOW TO START A GAME. To start a game, a player may move the mobile gaming device in a clockwise circular motion in a plane parallel to the ground.

12.5. HOW TO MAKE A SELECTION INA BONUS ROUND. To make a selection in a bonus round, a player may continue tilting the mobile gaming device to the right, with each tilt highlighting a different selection (e.g., a different door with a hidden present behind it). When the player's desired selection is highlighted, the player may tap the mobile gaming device against something to make the selection.

12.6. HOW TO CASH OUT. To cash out, a player may move the mobile gaming device up and down three times. Cashing out may include transferring a balance of credit stored locally on a mobile gaming device to a balance stored centrally, such as with a casino server. Cashing out may include causing a mobile gaming device or a nearby device (e.g., a device with which the mobile gaming device is in communication) to print out a ticket which is redeemable for cash.

13. USE MOTION OF THE MOBILE DEVICE TO CONTROL A STATIONARY GAMING DEVICE OR OTHER DEVICE. In various embodiments, the motion of a mobile gaming device may be used to control action at a stationary gaming device or at any other device. In various embodiments, the motion of a mobile gaming device may be used to provide instructions to a stationary gaming device or to any other device. The mobile gaming device may be in communication with the stationary gaming device, either directly (e.g., through direct wireless contact), or indirectly (e.g., with signals relayed through one or more intermediary devices, such as the casino server). In various embodiments, motions of the mobile gaming device may provide instructions to a stationary gaming device, where such instructions may include instructions to bet, to initiate a game, to cash out, to choose a particular choice from among several choices in a bonus round, to bet a particular amount, to discard a particular card, to make a particular decision in blackjack, to claim a jackpot, to call over a casino representative, or to take any other action. In various embodiments, the motions of a mobile gaming device may be translated in a direct or linear fashion to the motions of a cursor or pointer on the screen of a stationary gaming device. For example, when the mobile gaming device is moved to the right, the cursor may move to the right of the screen, and when the mobile gaming device is moved to the left, the cursor may move to the left of the screen. A player may activate or manipulate a control on the stationary gaming device by moving the mobile gaming device in such a way as to position the cursor on the stationary gaming device over the desired control. The player may then provide a final motion, such as shaking the mobile gaming device, to cause the control to be activated. Thus, for example, a player may move a mobile gaming device to the right in order to move a cursor on the screen of a stationary gaming device to the right to be positioned over a "bet" button (e.g., a rendition of a "bet" button). The player may then shake the mobile gaming device to actually place a bet of 1 credit. A player may use the mobile gaming device to control other devices as well, such as ATM machines or vending machines. For example, a player may use the motion of a mobile gaming device to select a product in a vending machine and to then purchase the product. For example, the products in a vending machine may have associated indicator lights. When the player moves the mobile gaming device the indicator light associated with one product may go off and the indicator light associated with another product may go on. The second product may lie in a direction from the first product which is the same direction that was indicated by the motion of the mobile gaming device. In some embodiments, a person may use the motions of a mobile device, such as a mobile gaming device, to control a point of sale terminal.

14. USE OF MOTION AND OTHER TYPES OF INPUT. In various embodiments, a player need not exclusively use motion control to play a game or to perform other actions with a mobile gaming device. For example, a player may specify a bet size by pressing a keypad, but may actually start a game using a motion, such as shaking the mobile gaming device. In some embodiments, a player may have a choice of ways in which to convey a given instruction. The same instruction may be conveyed through motion or through other means, such as through button presses. Thus, according to a player's fancy, the player may choose one way or the other for providing the same instruction.

The following are embodiments, not claims:

A. A method comprising:
detecting a first signal from a motion sensor, in which the first signal endures throughout a first period of time;
determining whether a second signal has endured throughout the first period of time;
determining, if the second signal has endured throughout the first period of time, an instruction based on the first signal; and
executing the instruction in a gambling game if the second signal has endured throughout the first period of time.

B. The method of embodiment A in which detecting a first signal includes detecting a first signal from a motion sensor contained within a mobile gaming device, in which the first signal endures throughout a first period of time.

C. The method of embodiment B in which the motion sensor comprises an accelerometer.

D. The method of embodiment B in which the motion sensor comprises a camera.

E. The method of embodiment B further including detecting a second signal from a button on the mobile gaming device, in which the second signal is generated through the application of pressure to the button.

F. The method of embodiment E in which determining whether a second signal has endured throughout the first period of time includes determining whether continuous pressure has been applied to the button throughout the first period of time.

G. The method of embodiment E in which the instruction is one of: (a) an instruction to place a bet; (b) an instruction to place a bet of a certain amount; (c) an instruction to begin the gambling game; (d) an instruction to discard a card; (e) an instruction to receive another card; (f) an instruction to receive no further cards; (g) an instruction to select an option in a bonus round; (h) an instruction to cash out; (i) an instruction to select a pay line; and (j) an instruction to begin a bonus round.

H. The method of embodiment E in which the first signal is generated through motion of the mobile gaming device.

I. A method comprising:
detecting a first signal from a motion sensor of a mobile gaming device;
interpreting the first signal as a specification of a first bet in a first game to be played at the mobile gaming device, the first bet denominated in valueless currency;
detecting a second signal from the motion sensor;
interpreting the second signal as a specification of a second bet in a second game to be played at the mobile gaming device, the second bet denominated in valuable currency; and
determining an outcome of the second game only if the first game has been completed.

J. The method of embodiment I in which the valueless currency is not exchangeable for United States dollars, and in which the valuable currency is exchangeable for United States dollars.

K. The method of embodiment I in which the second signal has similar characteristics to the first signal.

L. The method of embodiment I further including displaying, prior to detecting the first signal, a message on a display screen of the mobile gaming device, the message providing instructions to move the mobile gaming device in a particular way in order specify the first bet.

M. The method of embodiment I further including:
asking the player to provide a first proof of his identity following the completion of the first game;
asking the player to provide a second proof of his identity prior to determining the outcome; and
verifying that the second proof matches the first proof.

N. The method of embodiment M in which the first proof is a first fingerprint supplied to the mobile gaming device, and in which the second proof is a second fingerprint supplied to the mobile gaming device.

O. A method comprising:
receiving a signal indicative of a bet at a mobile gaming device with a rectangular display screen;
determining five cards;
displaying a first of the five cards in a first corner of the display screen;
displaying a second of the five cards in a second corner of the display screen;
displaying a third of the five cards in a third corner of the display screen;
displaying a fourth of the five cards in a fourth corner of the display screen;
determining a particular card of the five cards to be discarded;
determining a sixth card;
replacing the particular card with the sixth card;
determining a payout based on the sixth card and based on cards of the five cards that were not discarded; and
adjusting a credit balance based on the payout.

P. The method of embodiment O further including displaying a fifth of the five cards in the center of the display screen.

Q. The method of embodiment O in which determining a particular card of the five cards to be discarded includes:
detecting a motion of the mobile gaming device;
determining that the first of the five cards is to be discarded if the motion is a tilting of the mobile gaming device towards the first corner of the display screen;
determining that the second of the five cards is to be discarded if the motion is a tilting of the mobile gaming device towards the second corner of the display screen;
determining that the third of the five cards is to be discarded if the motion is a tilting of the mobile gaming device towards the third corner of the display screen; and
determining that the fourth of the five cards is to be discarded if the motion is a tilting of the mobile gaming device towards the fourth corner of the display screen.

R. The method of embodiment O in which determining a payout includes determining a payout based on the sixth card, based on cards of the five cards that were not discarded, and based on the rules of video poker.

The following sections I-X provide a guide to interpreting the present application.

I. Determining

The term "determining" and grammatical variants thereof (e.g., to determine a price, determining a value, determine an object which meets a certain criterion) is used in an extremely broad sense. The term “determining” encompasses a wide variety of actions and therefore “determining” can include calculating, computing, processing, deriving, investigating, looking up (e.g., looking up in a table, a database, or another data structure), ascertaining and the like. Also, “determining” can include receiving (e.g., receiving information), accessing (e.g., accessing data in a memory) and the like. Also, “determining” can include resolving, selecting, choosing, establishing, and the like.

The term “determining” does not imply certainty or absolute precision, and therefore “determining” can include estimating, extrapolating, predicting, guessing and the like.

The term “determining” does not imply that mathematical processing must be performed and does not imply that numerical methods must be used and does not imply that an algorithm or process is used.

The term “determining” does not imply that any particular device must be used. For example, a computer need not necessarily perform the determining.

II. Forms of Sentences

Where a limitation of a first claim would cover one of a feature as well as more than one of a feature (e.g., a limitation such as “at least one widget” covers one widget as well as more than one widget), and where in a second claim that depends on the first claim, the second claim uses a definite article “the” to refer to the limitation (e.g., “the widget”), this does not imply that the first claim covers only one of the feature, and this does not imply that the second claim covers only one of the feature (e.g., “the widget” can cover both one widget and more than one widget).

When an ordinal number (such as “first”, “second”, “third” and so on) is used as an adjective before a term, that ordinal number is used (unless expressly specified otherwise) merely to indicate a particular feature, such as to distinguish that particular feature from another feature that is described by the same term or by a similar term. For example, a “first widget” may be so named merely to distinguish it from, e.g., a “second widget”. Thus, the mere usage of the ordinal numbers “first” and “second” before the term “widget” does not indicate any other relationship between the two widgets, and likewise does not indicate any other characteristics of either or both widgets. For example, the mere usage of the ordinal numbers “first” and “second” before the term “widget” (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers “first” and “second” before the term “widget” does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

III. Terms

The term “product” means any machine, manufacture and/or composition of matter, unless expressly specified otherwise.

The term “process” means any process, algorithm, method, or the like, unless expressly specified otherwise.

Each process (whether called a method, algorithm or otherwise) inherently includes one or more steps, and therefore all references to a “step” or “steps” of a process have an inherent antecedent basis in the mere recitation of the term ‘process’ or a like term. Accordingly, any reference in a claim to a ‘step’ or ‘steps’ of a process has sufficient antecedent basis.

The term “invention” and the like mean “the one or more inventions disclosed in this application”, unless expressly specified otherwise.

The terms “an embodiment,” “embodiment,” “embodiments,” “the embodiment,” “the embodiments,” “one or more embodiments,” “some embodiments,” “certain embodiments”, “one embodiment,” “another embodiment” and the like mean “one or more (but not all) embodiments of the disclosed invention(s),” unless expressly specified otherwise.

The term “variation” of an invention means an embodiment of the invention, unless expressly specified otherwise.

A reference to “another embodiment” in describing an embodiment does not imply that the referenced embodiment is mutually exclusive with another embodiment (e.g., an embodiment described before the referenced embodiment), unless expressly specified otherwise.

The terms “including”, “comprising” and variations thereof mean “including but not limited to”, unless expressly specified otherwise.

The terms “a”, “an” and “the” mean “one or more”, unless expressly specified otherwise.

The term “plurality” means “two or more”, unless expressly specified otherwise.

The term “herein” means “in the present application, including anything which may be incorporated by reference”, unless expressly specified otherwise.

The phrase “at least one of”, when such phrase modifies a plurality of things (such as an enumerated list of things) means any combination of one or more of those things, unless expressly specified otherwise. For example, the phrase “at least one of a widget, a car and a wheel” means either (i) a widget, (ii) a car, (iii) a wheel, (iv) a widget and a car, (v) a widget and a wheel, (vi) a car and a wheel, or (vii) a widget, a car, and a wheel. The phrase “at least one of”, when such phrase modifies a plurality of things does not mean “one of each of” the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on."

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective, or consequence of something that is previously and explicitly recited. Thus, when the term "whereby" is used in a claim, the clause, or other words that the term "whereby" modifies do not establish specific further limitations of the claim or otherwise restricts the meaning or scope of the claim.

The term "e.g." and like terms mean "for example," and thus does not limit the term or phrase it explains. For example, in the sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "respective" and like terms mean "taken individually." Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is," and thus limits the term or phrase it explains. For example, in the sentence "the computer sends data (i.e., instructions) over the Internet," the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits, and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase “means for” or the phrase “step for” means that 35 U.S.C. § 112, paragraph 6, applies to that limitation.

In a claim, a limitation of the claim which does not include the phrase “means for” or the phrase “step for” means that 35 U.S.C. § 112, paragraph 6 does not apply to that limitation, regardless of whether that limitation recites a function without recitation of structure, material or acts for performing that function. For example, in a claim, the mere use of the phrase “step of” or the phrase “steps of” in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material, or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function. Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Some Embodiments

In various embodiments, a distributed gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc.), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The gaming system may be implemented over a communications network such as a cellular network or a private wireless and/or wireline network. Examples of the latter include Wi-Fi and WiMAX networks. In some embodiments, the gaming system communications network is entirely independent of the Internet. In some embodiments, the gaming system operation makes minimal use of the Internet, such that only information for which there are no security issues is transmitted via the Internet and/or such that information may be encrypted. In various embodiments, the communications network enables players to participate in gaming from remote locations (e.g., outside of the gaming area of a casino). Also, the system may enable players to be mobile during participation in the gaming activities. In various embodiments, the system has a location verification or determination feature, which is operable to permit or disallow gaming from the remote location depending upon whether or not the location meets one or more criteria. The criterion may be, for example, whether the location is within a pre-defined area in which gaming is permitted by law.

As shown in FIG. 1, for example, gaming system 10 may include at least one user 12. The system may include additional users such that there is at least a first user 12 and a second user 14. Multiple users may access a first gaming system 10, while other multiple users access a second gaming system (not shown) in communication with first gaming system 10. Users 12 and 14 may access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 may be flexible, however, and computer 18 may reside adjacent to or remote from the domain of gaming service provider 20. Various embodiments may not include a gaming service provider. The computer 18 and/or gaming service provider 20 may reside within, adjacent to, or remote from a gaming provider (not shown in FIG. 1). The gaming service provider may be an actual controller of games, such as a casino. As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

In various embodiments, software resides on both the gaming communication device 13 and the computer 18. Software resident on gaming communication device 13 may be operable to present information corresponding to gaming activities (including gambling and non-gambling activities discussed herein) to the user. The information may include, without limitation, graphical representations of objects associated with the activities, and presentation of options related to the activities and selectable by the user. The gaming communication device software may also be operable to receive data from the computer and data input by the user. Software resident on the computer may be able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), Wi-Fi (802.11x), WiMAX (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are also contemplated. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In some embodiments, the communication of gaming information takes place without involvement of the Internet. However, in some embodiments, a portion of the gaming information may be transmitted over the Internet. Also, some or all of the gaming information may be transmitted partially over an Internet communications path. In some embodiments, some information is transmitted entirely or partially over the Internet, but the information is either not gaming information or is gaming information that does not need to be maintained secretly. For instance, data that causes a graphical representation of a table game on the user's gaming communication device might be transmitted at least partially over the Internet, while wagering information transmitted by the user might be transmitted entirely over a non-Internet communications network.

Figure 2:
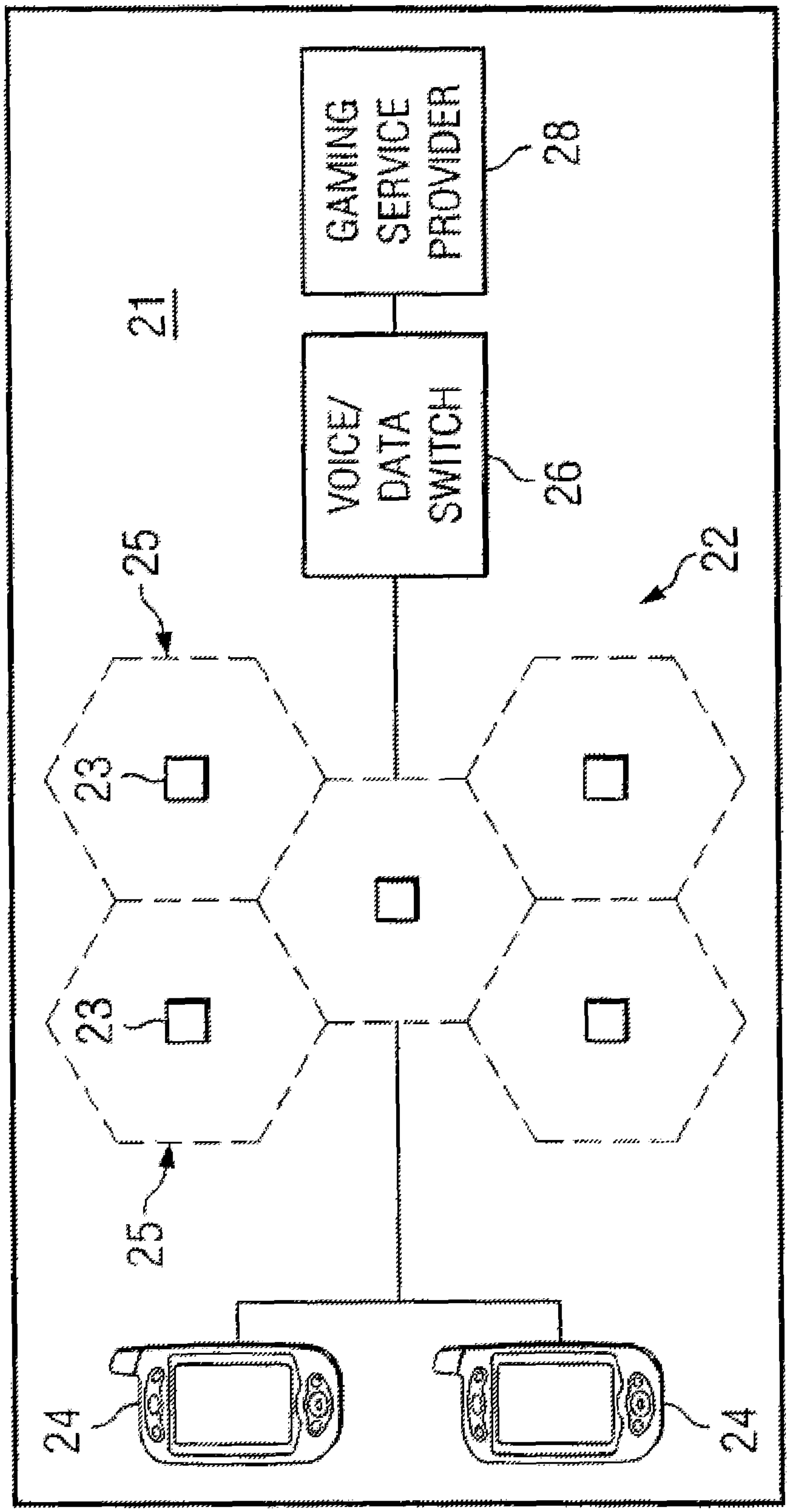
FIG. 2 shows a communications network according to some embodiments.

According to some embodiments, as shown in FIG. 2 for example, the communications network comprises a cellular network 22. Cellular network 22 comprises a plurality of base stations 23, each of which has a corresponding coverage area 25. Base station technology is generally known, and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network also includes at least one voice/data switch, which may be connected to the wireless portion of the network via a dedicated, secure landline. The communications network may also include a gaming service provider, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone.

In various embodiments, in the case of a cellular network for example, the gaming system is enabled through the use of a private label carrier network. Each base station is programmed by the cellular carrier to send and receive private secure voice and/or data transmissions to and from mobile station handsets. The handsets may be pre-programmed with both gaming software and the carrier's authentication software. The base stations communicate via private T1 lines to a switch. A gaming service provider leases a private T1 or T3 line, which routes the calls back to gaming servers controlled by the gaming service provider. Encryption can be installed on the telephones if required by a gaming regulation authority, such as a gaming commission.

The cellular network may be a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices may not be allowed to "connect" to the Internet. This ensures a high level of certainty that bets/wagers originate and terminate within the boundaries of the gaming jurisdiction and the "private" wireless system cannot be circumvented or bypassed. Although in some embodiments some data and/or voice traffic may be communicated at least partially over the Internet, the communication path may not include the Internet in other embodiments. Alternatively, in some embodiments, certain non-gaming information may be transported over a path which includes the Internet, while other information relating to the gaming activities of the system is transported on a path that does not include the Internet.

Figure 3:
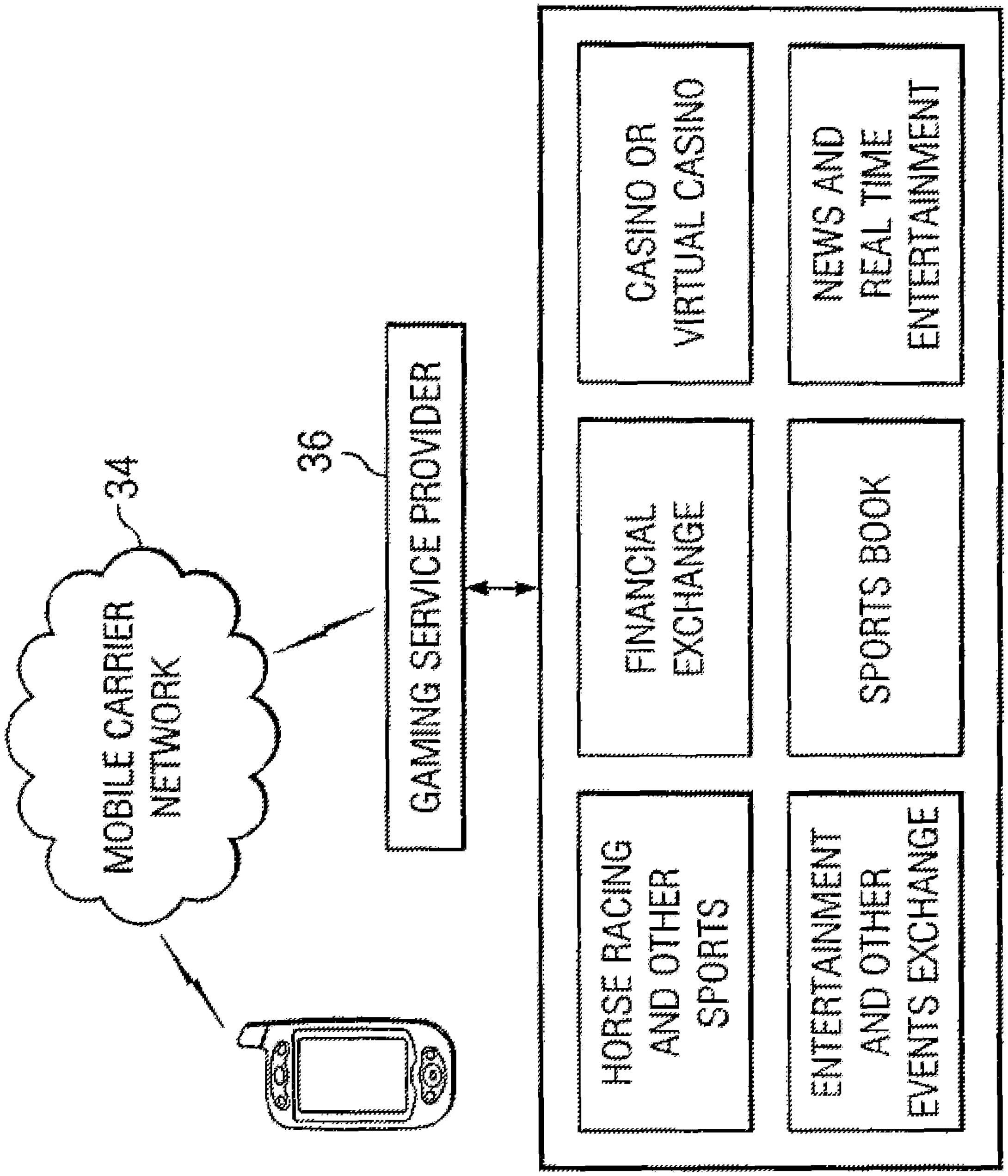
FIG. 3 shows a gaming service provider in communication with a gaming communication device according to some embodiments.

As shown in FIG. 3, a gaming communication device 32 is in communication with a gaming service provider over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential activities.

Figure 4:
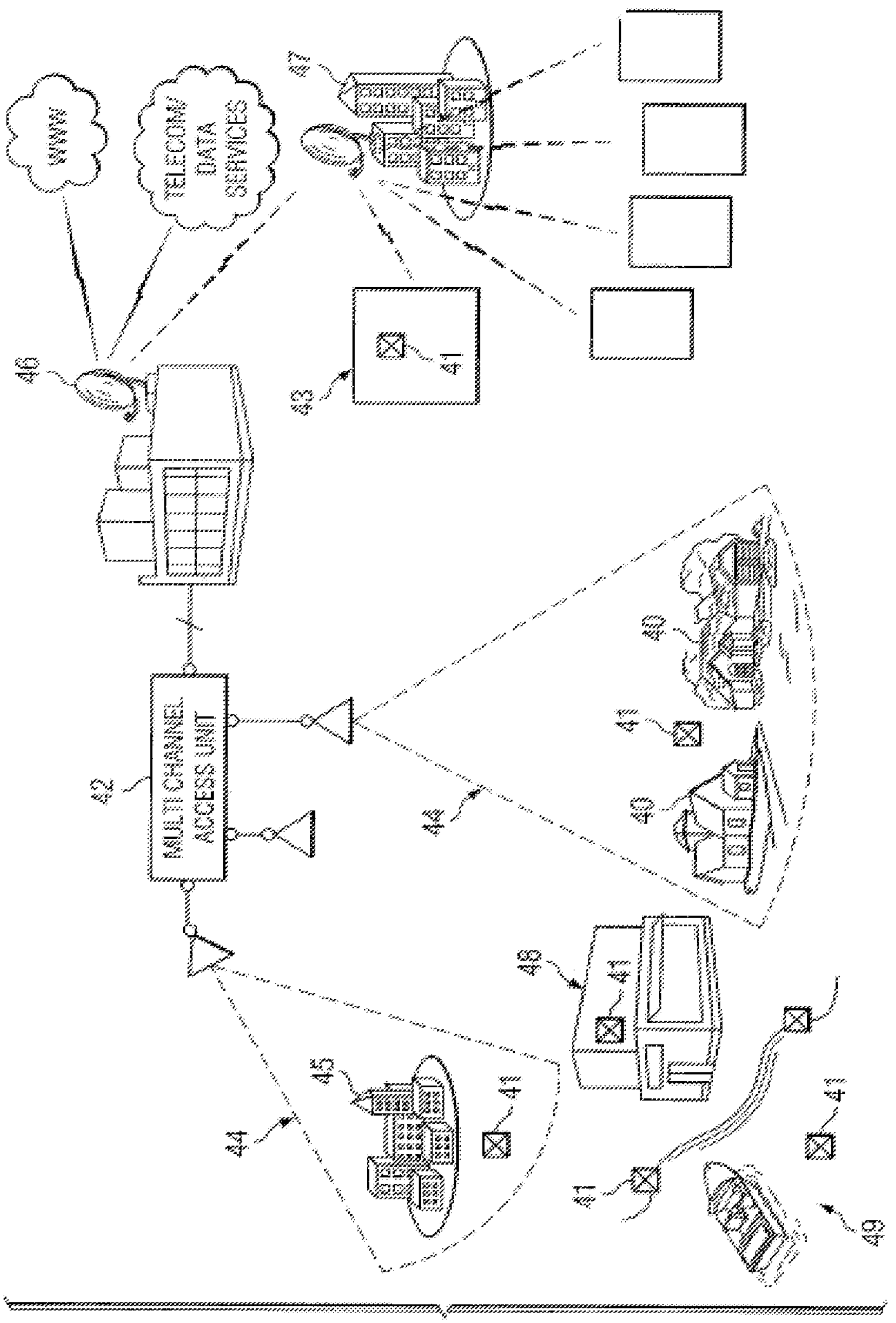
FIG. 4 shows a communications network according to some embodiments.

In another embodiment, as shown in FIG. 4, for example, the communications network comprises a private wireless network. The private wireless network may include, for example, an 802.11x (Wi-Fi) network technology to cover "Game Spots" or "Entertainment Spots." In FIG. 4, various Wi-Fi networks are indicated as networks 41. Networks 41 may use other communications protocols to provide a private wireless network including, but not limited to, 802.16x (WiMAX) technology. Further, networks 41 may be interconnected. Also, a gaming system may comprise a combination of networks as depicted in FIG. 4. For example, there is shown a combination of private wireless networks 16, a cellular network comprising a multi-channel access unit or sectorized base station 42, and a satellite network comprising one or more satellites 46.

With respect to the private wireless network, because the technology may cover small areas and provide very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote gaming areas 43. The configuration of the overall gaming system depicted in FIG. 4 is intended only as an example and may be modified to suit various embodiments.

In some embodiments, the system architecture for the gaming system includes:

(1) a wireless LAN (Local Access Network) component, which consists of mostly 802.11x (Wi-Fi) and/or 802.16x WiMAX technologies; robust security and authentication software; gaming software; mobile carrier approved handsets with Windows® or Symbian® operating systems integrated within; and (a) CDMA-technology that is secure for over-the-air data protection;

(b) at least two layers of user authentication, (that provided by the mobile carrier and that provided by the gaming service provider);

(c) compulsory tunneling (static routing) to gaming servers;

(d) end-to-end encryption at the application layer; and (e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;

(3) private MAN (Metropolitan Access Network) T1 and T3 lines to provide connectivity where wireless services cannot reach; and (4) redundant private-line communications from the mobile switch back to the gaming server.

Each of the "Game Spots" or "Entertainment Spots" is preferably connected via the MWAN/MAN back to central and redundant game servers. For accessing the private wireless networks 41, the gaming communication devices may be Wi-Fi- or WiMAX-enabled PDAs or mini-laptops, and do not have to be managed by a third-party partner.

In various embodiments, the gaming system includes a location verification feature, which is operable to permit or disable gaming from a remote location depending upon whether or not the location meets one or more criteria. A criterion may be, for example, whether the location is within a pre-defined area in which gaming is permitted by law. As another example, a criterion may be whether the location is in a no-gaming zone, such as a school. The location verification technology used in the system may include, without limitation, "network-based" and/or "satellite-based" technology. Network-based technology may include such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In some embodiments, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 5:
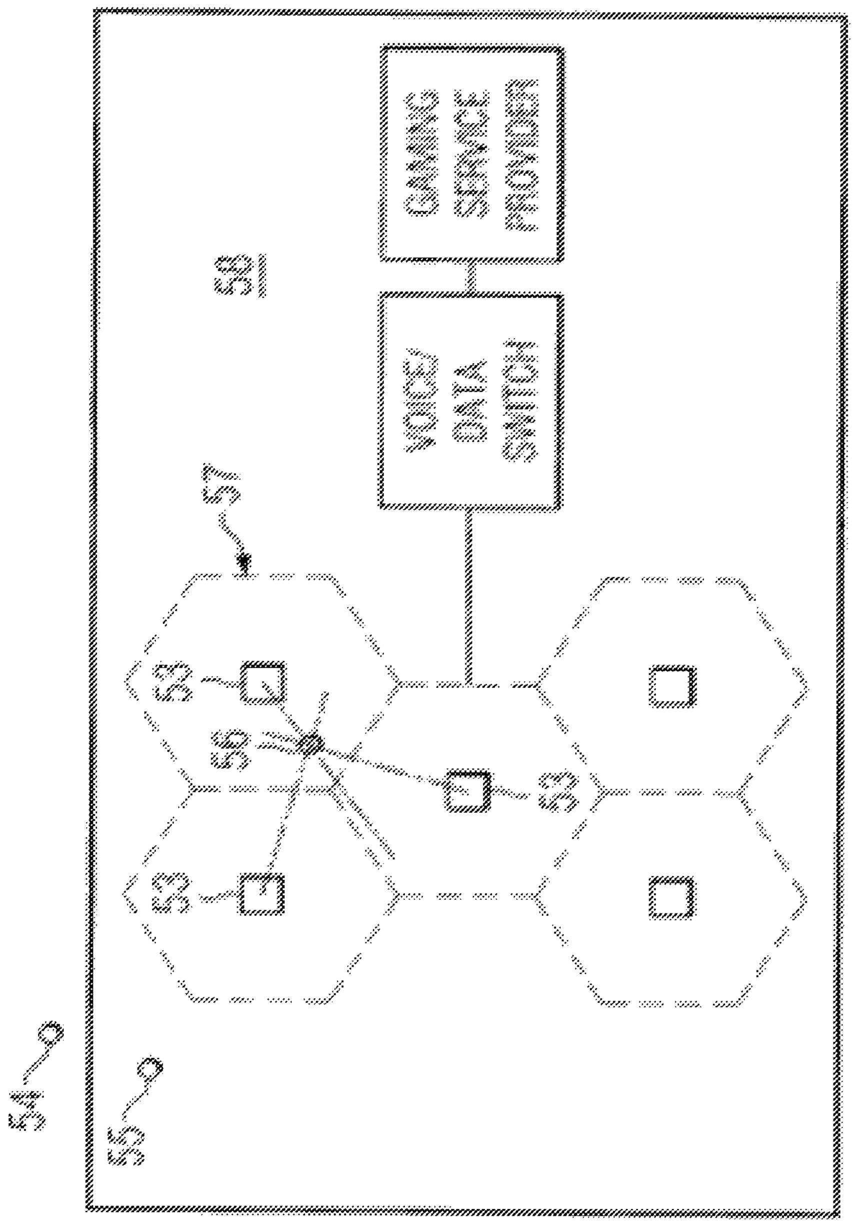
FIG. 5 shows a gaming system according to some embodiments.

As shown in FIG. 5, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access.

Geo-fencing may not specify location. Rather, it may ensure that a mobile station is within certain boundaries. For instance, geo-fencing may be used to ensure that a mobile station beyond state lines does not access the gaming system. Triangulation on the other hand may specify a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with the present invention meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In various embodiments, location verification is accomplished using channel address checking or location verification using some other identifying number or piece of information indicative of which network or portion of a network is being accessed by the gaming communication device. Assuming the usage of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In some embodiments, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. In various embodiments, the gaming service provider either maintains, or has access to, a database that maps the various possible worldwide mobile network identifying numbers to geographic areas. Various embodiments contemplate using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In various embodiments, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

Figure 6:
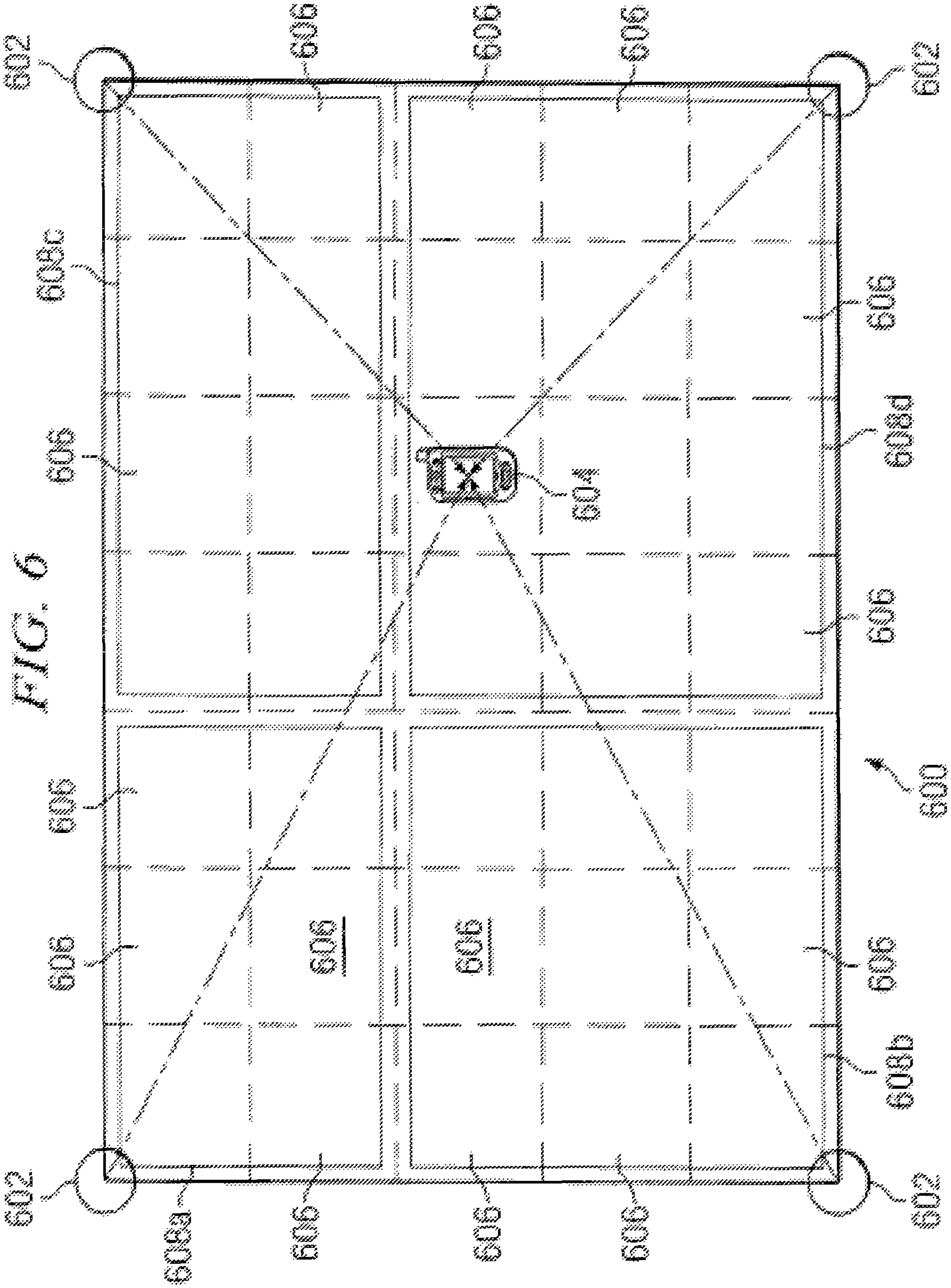
FIG. 6 shows a wireless gaming system according to some embodiments.
Figure 7:
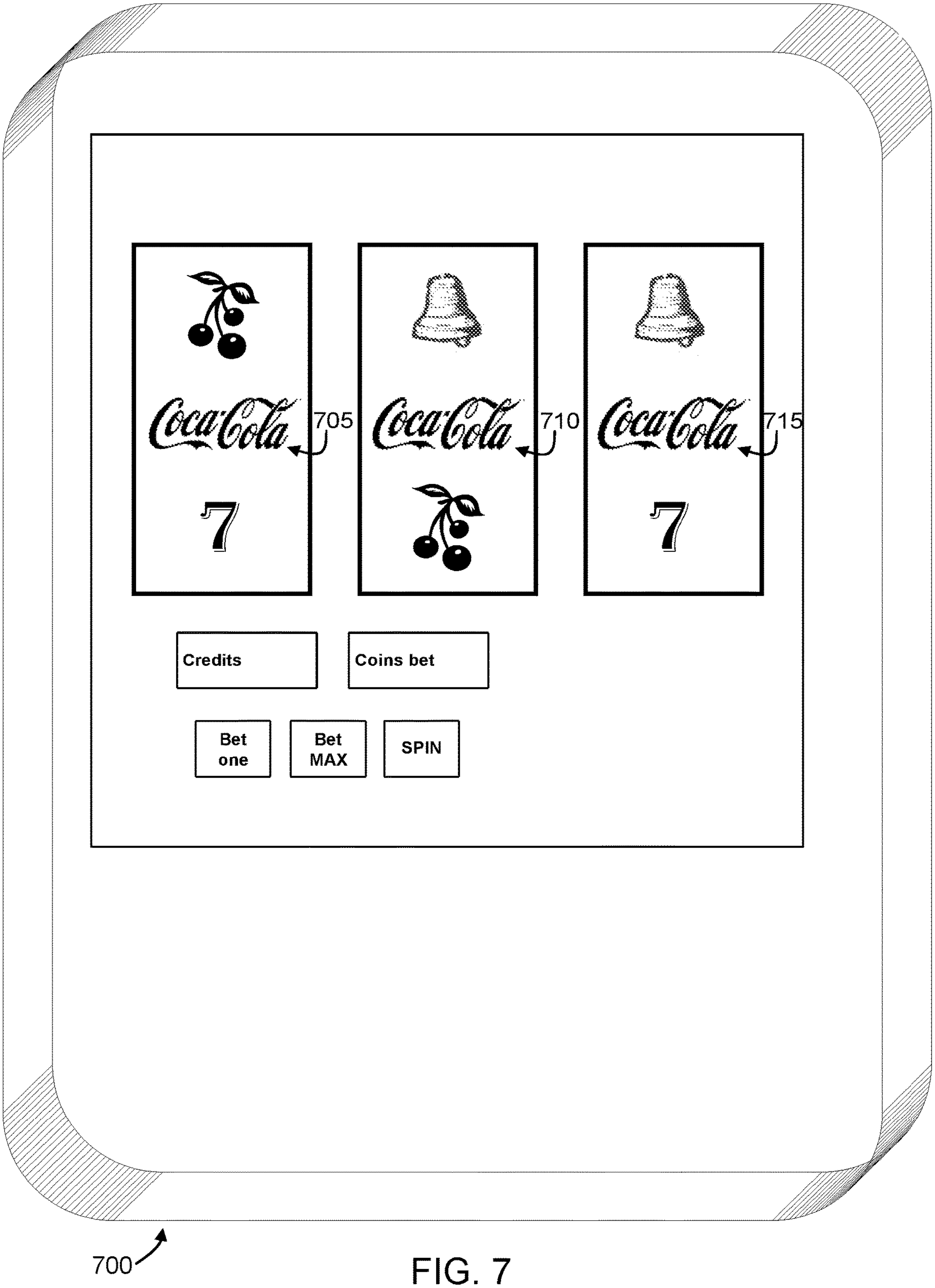
FIG. 7 shows a mobile gaming device with promotional content according to some embodiments.

In various embodiments, a gaming system may include the ability to determine the location of the gaming communication device within a larger property, such as a casino complex. This may allow certain functionalities of the device to be enabled or disabled based upon the location of the device within the property. For example, government regulations may prohibit using the device to gamble from the guest rooms of a casino complex. Therefore, particular embodiments may include the ability to determine the location of the device within the property and then disable the gambling functionality of the device from a guest room, or other area where gambling is prohibited. FIG. 6 illustrates an example of a wireless gaming system in which the location of a gaming communication device 604 may be determined in accordance various embodiments.

As shown in FIG. 6, a wireless gaming system comprises a wireless network that at least partially covers casino complex 600 in which one or more gaming communication devices 604 may be used to participate in a variety of gaming activities. The wireless network may comprise at least three signal detection devices 602, although various embodiments may include fewer or greater than three signal detection. As shown in FIG. 6, the wireless network comprises four signal detection devices 602, each located at one corner of casino complex 600. In various embodiments, these signal detection devices may comprise wireless access points, wireless routers, wireless base stations, satellites, or any other suitable signal detection device. Furthermore, although signal detection devices 602 are illustrated as being located on the boundaries of casino complex 600, signal detection devices may be located anywhere inside or outside of casino complex 600, provided the signal detection devices are operable to receive signals originating from a gaming communication device 604 inside casino complex 600. In various embodiments, signal detection devices 602 may also be used to transmit, as well as receive, signals to gaming communication device 604.

In various embodiments, casino complex 600 may be divided into one or more zones 608, which represent different areas of the casino complex, such as the lobby, guest rooms, restaurants, shops, entertainment venues, and pool areas. For example, as shown in FIG. 6, zone 608*a* may correspond to the casino lobby, zone 608*b* may correspond to guest rooms, zone 608*c* may correspond to restaurants, and zone 608*d* may correspond to the gaming floor of the casino. Each zone 608 may be further divided into one or more sub-zones 606, each specifying a particular location within zone 608. Sub-zones 606 may be arranged in a grid formation, each sub-zone 606 having a uniform size. In some embodiments, each sub-zone may comprise 9 square feet (i.e., 3 feet by 3 feet). In some embodiments, each sub-zone may comprise 100 square feet (i.e., 10 feet by 10 feet). The choice of the size of an area covered by a sub-zone may depend on administrator preferences, technical limitations of the wireless network, and governmental regulations, as well as other considerations.

Particular embodiments may use this mapping of casino complex 600 into a plurality of zones 608 and sub-zones 606 to determine the location of gaming communication device 604 within the complex. These embodiments may utilize the signal received by signal detection devices 602 from gaming communication device 604 to determine the location of the device.

In various embodiments, the location of gaming communication device 604 may be determined based upon the strength of the signal received by each signal detection device 602 from device 604. In various embodiments, this may be accomplished using a Received Signal Strength Indication (RSSI) value or any other suitable indication of signal strength. Generally, the closer a sub-zone is to a signal detection device, the stronger the signal the signal detection device will receive from a gaming communication device located in that sub-zone. Therefore, given a plurality of signal strength readings taken from different points in the casino complex (i.e., signal detection devices 602), these different signal strength readings may be used to determine the location of the device.

With this in mind, each sub-zone 606 of casino complex 600 may be associated with a reference set of signal strengths received by the signal detection devices from a device located in that particular sub-zone. Typically, these values are generated, and periodically recalibrated, by taking a reference reading from a gaming communication device located that sub-zone. After each sub-zone is associated with a reference set of signal strengths, these reference signal strengths may be compared with the signal strengths received by the signal detection devices from a gaming communication device. Since each sub-zone has a unique set of signal strengths, this comparison may be used to identify the particular zone in which the gaming communication device is located.

In various embodiments, the location of gaming communication device 604 may be determined based upon an elapsed time between the transmission of the signal from device 604 and the receipt of the signal by each signal detection device 602. In various embodiments, this elapsed time may be determined based on a Time Difference of Arrival (TDOA), or any other suitable technology. As before in the case of signal strengths, each sub-zone 606 may be associated with a predetermined, or reference, set of elapsed times from transmission to receipt of a signal from a gaming communication device. This set of elapsed times will be different for each sub-zone of the casino complex, as the time it takes a signal to reach each signal detection device will depend on the proximity of the sub-zone to each base station. By comparing the time from transmission to receipt of a signal received by the signal detection devices from a gaming communication device, the sub-zone in which the device is located may be determined.

Once the location of the gaming communication device has been determined, particular embodiments may then enable and/or disable particular functions of the device based on this determination. For example, as mentioned previously, particular embodiments may disable the gaming communication device's gambling functionality from a user's guest room, while still allowing the user to use other device functions, such as purchasing merchandise or services, or buying tickets to an entertainment event. Once the user leaves his or her guest room, the gambling functionality of the gaming communication device may be enabled. Similarly, particular embodiments may prevent the gaming communication device from being used to make financial transactions from the casino floor. Once the user leaves the casino floor, such functionality may be enabled. Similarly, other functionalities of the gaming communication device may be enabled or disabled based upon the location of the device within the property in accordance with various embodiments.

In various embodiments, the various functionalities of the gaming communication device may be enabled or disabled based upon the zone 608 in which the device is located. In such embodiments, each zone 608 of the casino complex may be associated with a set of allowed activities. For example, the "lobby" zone 608*a* of the casino complex may have all activities allowed, while the "guest room" zone 608*b* of the property may have all activities allowed except gambling. Based upon the gaming communication device's location, the functionality of the gaming communication device may be limited to the set of allowed activities for the zone in which the device is located. As the gaming communication device travels from zone to zone, the location of the device may be re-determined, and the functionality of the device may be updated to reflect the set of allowed activities for the zone in which the device is now located.

Various embodiments may also use the location determination to send location-specific information to the gaming communication device. For example, a reminder that an entertainment event to which the user has tickets is about to begin may be sent to the user's device if the device (and therefore the user) is located in a different part of the casino complex. In another embodiment, a user may be alerted that the user's favorite dealer is on the casino floor if the user is located in his or her guest room.

In various embodiments, the location of the gaming communication device may be used to deliver goods and services purchased or ordered by the user of the device. For example, in various embodiments, the user may purchase food and beverages using the device. The location of the device may then be used to deliver the food and beverages to the user, even if the user relocates to another sub-zone after placing his or her order.

The determination of the gaming communication device's location may also be used to provide the user with directions to another part of the casino complex. For example, a user that is located on the casino floor that wishes to go to a specific restaurant within the complex may be given direction based upon his or her location. These directions may then be updated as the user progresses towards his or her desired location. In the event the user gets off-course, the location determination, which may be updated during the user's travel, may be used to alert the user that he/she has gotten off-course and then plot a new course to the desired destination.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

User Profiles

According to various embodiments, the wireless gaming system can incorporate a user profile element. One or more user profiles may be created, maintained, and modified, for example, on one or more of the servers of the gaming system. Generally, the user profiles include information relating to respective users. The information may be maintained in one or more databases. The information may be accessible to the gaming server and/or to one or more mobile devices. The devices which may access the information may, according to certain embodiments, include gaming devices or gaming management devices. Gaming management devices may include wireless devices used by casino staff to provide gaming services or gaming management services.

Various embodiments include software and/or hardware to enable the provision, modification, and maintenance of one or more user profiles. Thus, one or more user profiles may each comprise a set of data maintained in a data storage device. The data set(s) for each respective user profile may reflect any of a number of parameters or pieces of information, which relate to the particular user(s) corresponding to the profile(s). Although not intended to be exhaustive, such information may include, for example, gaming activity preferences, such as preferred game and/or game configuration, preferred screen configuration, betting preferences, gaming location preferences, dining, and other service preferences, and so forth. The information may also include user identity information, such as name, home address, hotel name and room number, telephone numbers, social security numbers, user codes, and electronic files of fingerprint, voice, photograph, retina scan, or other biometric information. User profile information may also include information relating to the user, but not determined by the user or the user's activities. Such information may include any information associated with, or made part of, a profile. For example, an entity such as a casino may include as part of a profile certain rules governing the distribution of promotions or offers to the user. User profile information can include any codes, account numbers, credit information, approvals, interfaces, applications, or any other information which may be associated with a user. Thus, user profile information may include any information that is particular to a given user. For example, profile information may include the location(s) at which a particular user has played, skill levels, success levels, types of games played, and betting styles, and trends of information relating to the user's activities.

In various embodiments, user profile information may include concierge or other service information that is associated with a user. Concierge services may include restaurant services, entertainment services, hotel services, money management services, or other appropriate services that may be offered to the user of a gaming device. For example, restaurant services may include, without limitation, services that allow the user to order drinks, order food, make reservations, or perform other restaurant related activities. As another example, entertainment services may include, without limitation, services that allow the user to purchase show tickets, arrange appointments or services, virtually shop, arrange transportation, or perform other entertainment related activities. Hotel services may include, for example, services that allow the user to check in, check out, make spa appointments, check messages, leave messages, review a hotel bill, or perform other guest-related activities. Money management services may include, for example, services that allow the user to transfer funds, pay bills, or perform other money management activities.

The gaming system may be configured to establish a new profile for any user who is using a gaming device for the first time. Alternatively, a new profile may be established for a prior user who has not played for a predetermined time period. The gaming system may set up the profile, monitor user activities, adjust the profile, and adjust information (such as graphics) displayed to the user. The gaming system may be configured to use the profile information to alter the presentation of gaming information to the user. For example, if a prior user has returned to the gaming system, the system may consult the profile for the user and determine that in the prior session of gaming the user lost money on craps but won money on blackjack. Based on this information, the system may adjust the default gaming screen and present a blackjack table for the user. As a further example, the profile information may indicate that the majority of the user's prior blackjack time was spent on $25 minimum tables. The system may, accordingly, make a further adjustment to the gaming environment and make the blackjack table being presented a $25 table. In this sense, the gaming system enables personalized wireless gaming based on one or more criteria maintained in a user profile.

The user profiles may be established, maintained, and periodically updated as necessary to enable a gaming provider to provide an enhanced, current, and/or customized gaming experience. Updates may be undertaken based on any suitable trigger, such as the occurrence of an event, the occurrence of a user activity, or the passage of a certain predetermined time period. Any or all of the profile information may be updated.

Alerts

In some embodiments, the gaming system may be configured to initiate one or more alerts to one or more users based on any number of criteria. For instance, an alert may be based on the location of a user. The system may also be configured to keep track of other non-location dependent parameters. The initiation of an alert may depend on a time parameter. Gaming alerts can also be based on this and/or other information maintained in a user profile. Alerts can be prioritized for presentation and the content and display of the alerts may be customized by the user or another entity. As a related concept, the system may be configured to provide directions and/or maps. Another related concept involves enabling a user to view a certain activity or area remotely. The alert may be generated in response to the existence of data within a user profile. Additionally, the content and presentation of the alert may be determined based on information in the user profile. Thus, when the alerts occur and what the alerts indicate may be customized or tailored according to user preferences (or any other information maintained about the user (e.g., in a user profile).

In some embodiments, an alert may be presented or displayed to the user in a format determined, at least in part, by any of the parameters described or contemplated herein. For example, if the user is located outdoors, the display may be automatically brightened in order to allow the user to more easily view the alert. The alert may be presented in any one or a combination of textual, visual, oral, or other information exchange formats. Alerts presented to users on the screen of a gaming communication device, for example, may be configured in any desirable manner. Preferably, the information is displayed in a way as to most effectively utilize the screen real estate to convey the alert message. Thus, different alerts of differing types, or having differing priorities, can be displayed differently on the gaming device. For example, a more important alert can be displayed as a popup while secondary alerts scroll at the bottom of the screen. The player can register for alerts and determine his own particular alert configuration preferences.

According to some embodiments, directional information may be provided to one or more users. The directional information may be associated with an alert. The directional information may be based on any of the parameters described herein (e.g., profiles, alerts, locations, changes in play or other activities, etc.). Directions may be given to activities, locations, seats, tables, recreational spots, restaurants, change cages, information booths, casinos, hotels, sports venues, theaters, etc. For example directions may be given to a particular table or gaming area, a casino other than the one where the user is presently located or where another user is located, a restaurant that is specified in a user profile, a sports book area of a casino, a hotel room, etc.

The directions can be presented orally, textually, and/or graphically (e.g., as map with zoom capabilities). An example of how directions would be provided involves a user profile indicating that the user likes to play high-limit blackjack on Saturday nights, but that the user does not have a particular casino preference. If the user enters any casino for which the system is operable, the system provides the user with an alert inviting the player to the high-limit blackjack tables and directional information in the form of a visual route. Another example involves a user leaving a sports book in a casino and the user has indicated that he wants to play craps. The device gives walking directions to the craps tables. Another example involves a user that has a preferred list of dinner restaurants. At a predetermined time (e.g., 8:00 pm), the system presents the user with the list, lets the user make a selection and a reservation. The system then provides the user with verbal directions from the user's current location to the selected restaurant. The system may also be configured to provide ancillary information based, at least in part, on the alert, the profile, or the directional information being provided. For example, the system may notify a user that the user will need a cab, or will need to take the tram, or will need a jacket and tie, or will need an umbrella, etc. depending on where the user is going and the route he is taking.

According to various embodiments, the system enables a user to view a certain activity or area remotely. For example, cameras (or other viewing devices) may be disposed throughout a casino property (or other relevant area). At kiosks, or on the wireless gaming devices, users can "peek" into one or more selected areas to see the activity in the selected area(s). For example, from the pool, a user can tell if the craps tables have changed limits or are filling up with people. From the craps table, a user can see if the restaurant or bar is becoming crowded.

According to various embodiments, the operation of the alerts module and the alerts methods are integrated with various techniques for managing user profile information. An example of this aspect is that the system may be configured to recognize that a user has certain preferred dealers or stickmen when playing certain casino games. When those dealers or stickmen are on duty, and if the user is located in a certain area, or within a certain distance, an alert may be sent inviting the user to participate in the gaming activity at the particular table where the dealer or stickman is on duty.

Thus, when user profile information indicates that a one or more predetermined criteria are met, the system may send an alert to the corresponding user or to another user. For example, the system may "learn" that a player is a fan of certain sports teams. The system monitors information about upcoming events that involve those teams and, at a predetermined time, checks to see if the user has placed a bet on the event(s). If not, the system invites the user to visit a sports book to make a bet. As another example, the system knows a user prefers $10 minimum tables and alerts the user to the opening of a seat at such a table. As another example, the alerts can be triggered by information which is not directly related to or associated with the particular user (e.g., non-user specific information). For instance, an alert might be triggered by a certain time or the occurrence of a certain event (e.g., the odds given on a certain sports event changing by a certain predetermined amount).

Service Applications

According to various embodiments, gaming services may be provided as an application add-on to a pre-existing communication or data service. Thus, gaming service applications may be made available to customers of a pre-existing communication or data service. For example, customers of a particular wireless telephone or data service may be offered any one or combination of the various gaming service applications discussed herein as an additional feature that is bundled with the telephone or data service. Although this document may refer to the communication service bundled with offered gaming service applications as including pre-existing communication services, it is recognized that the gaming services applications may be offered and accepted as part of a package with newly-activated communications service plan. In still other embodiments, the gaming service may be established first and the communication service may be added later.

The gaming service applications bundled with, or otherwise offered in conjunction with communication services, may be customized to meet the needs of the customers, service providers, or both. For example, a service provider may elect to make certain gaming service applications available to only a subset of the service providers' customers. Accordingly, not all customers associated with a service provider may be offered gaming services. As another example of customized gaming service applications, a communication service may offer customers a number of gaming service plans which may provide different levels of service. For example, certain services such as advertisement services and/or promotional services may be free to customers of the communications service. Such levels of service may be customer-selected, service provider-selected, or both.

Customers may be billed separately for add-on gaming services, or in conjunction with the invoice the customer already receives for the pre-existing communications service. For instance, in certain embodiments, gaming services may be billed as an add-on in the same way that Caller ID services, call waiting services, and call messaging services result in fees that are in addition to the basic fees associated with communication services.

Peer-to-Peer Wireless Gaming

According to various embodiments, gaming services enable peer-to-peer wireless gaming. Specifically, the system may enable multiple players to participate in the same gaming activity at the same time from dispersed locations. This may be particularly desirable in the case of certain games such as, but without limitation, horse racing, poker, and blackjack. The system may also enable a single player to participate in multiple positions with respect to a particular game. For example, a user may be permitted to play multiple hands of blackjack. Particular aspects include such features as providing assistance to a user in finding a particular activity. For example, a first player may want to play poker at a six-person table. The gaming system may be used to identify such a poker table that has a position available for the first user's participation. Additionally or alternatively, a first player might want to play poker at the same table as a second player, and the system may be configured to assist the first player in finding a game in which the second player is already participating.

Location determination techniques may be incorporated to enable peer-to-peer gaming or related services. For example, a "buddy network" may be established to track members of a selected group. For example, a group of friends might all be in a gambling jurisdiction but be located at various dispersed places within that jurisdiction. The gaming system allows the establishment of a private buddy network of peers for this group of friends. The system enables one or more members of the group to track one or more other members of the group. In various embodiments, the system may also allow messages from and to one or more group members. For example, the system also allows members to invite other members to participate in certain wireless gaming activities. Additionally or alternatively, the system may allow members of the group to bet on the performance of another member of the group who is participating in a virtual or actual game.

Location determination techniques may also be incorporate to establish an "alert system." The alert system may be used to invite certain types of players to participate in a gaming activity. Criteria may then be used to identify users of gaming devices that meet the criteria. For example, a gaming participant may wish to initiate a gaming activity with other users of gaming devices that qualify as "high rollers" or "high stakes gamers." As other examples, a celebrity user may wish to initiate a gaming activity with other celebrities, or a senior citizen may wish to initiate a gaming activity with other senior citizens. In each instance, the user may identify criteria that may then be used to identify other gaming participants that meet these criteria for the initiation of a peer-to-peer gaming event.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Gaming and Wireless System

Various embodiments include a gaming system including hand-held personal gaming devices. The gaming system is adapted to present one or more games to a user of one of the hand-held gaming devices.

In various embodiments, the gaming system includes a portable gaming device or interface. The portable gaming device has a display for displaying game information to a player, at least one input device for receiving input from the player and is capable of receiving and sending information to a remote device/location. The gaming system also includes a game server for generating game data, transmitting game data to the portable gaming device, and receiving information, such as player input, from the portable gaming device. The gaming system further includes a payment transaction server for validating payment and establishing entitlement of a player to play a game via the portable gaming device as provided by the game server.

In various embodiments, the gaming system includes one or more stationary gaming machines or other devices capable of printing tickets having a value associated therewith. The portable gaming device includes a ticket reader for reading ticket information for use by the payment transaction server in verifying the associated value for permitting the player to play the game.

In one or more embodiments, the portable gaming devices communicate with other devices (such as the game server) via a wireless communication channel. Appropriate relays and transceivers are provided for permitting the wireless communication.

In one or more embodiments, the portable gaming device includes a plurality of interfaces for changing the configuration of the gaming device or interacting with one or more transaction servers. In some embodiments, a login interface is provided for receiving login information regarding a user of the device. In various embodiments, the number of interfaces or other functions or features displayed or permitted to be accessed are configured depending upon the user of the device. In the event a gaming representative identifies himself, interfaces permitting access to a variety of control functions may be provided. In the event a player identifies themselves, such control functions may not be accessible, but instead only consumer-related functions may be accessible such as game play.

In one or more embodiments the gaming system includes one or more transaction servers, such as a food transaction server. Using an interface of the portable gaming device a player or other user may request services from the food transaction server. For example, a player may request food, drink, a restaurant reservation, or other service.

One or more embodiments comprise a method of playing a game via a portable gaming device associated with a gaming network. In some embodiments, a player obtains a portable gaming device, such as by checking out the device from the hostess station of a restaurant or the front desk of a hotel/casino. The player provides value to the gaming operator, such as a credit card or cash deposit. This value is associated with the server and matched with a ticket number, player tracking number or other identifier.

The game device is configured for player play using the login interface. The act of logging in may be performed by the player or the gaming operator. The player next establishes entitlement to obtain services, such as the playing of a game, by showing the existence of value. In some embodiments, the player scans his ticket using the ticket reader of the device. The scanned information is transmitted to the payment transaction server for verifying entitlement of the player to play a game or obtain other services. In the event the entitlement is verified, then the player is permitted to engage in the play of a game or request service.

In the event a player wishes to play a game, the player indicates such by selecting a particular game using a game play interface. Upon receipt of such an instruction, the game server generates game data and transmits it to the personal gaming device. The transmitted data may comprise sound and video data for use by the personal gaming device in presenting the game. The player is allowed to participate in the game by providing input to the game server through the personal gaming device. The game server determines if the outcome of the game is a winning or losing outcome. If the outcome is a winning outcome, an award may be given. This award may be cash value which is associated with the player's account at the payment transaction server. If the outcome is a losing outcome, then a bet or wager placed by the player may be lost, and that amount deducted from the player's account at the transaction server.

Figure 8:
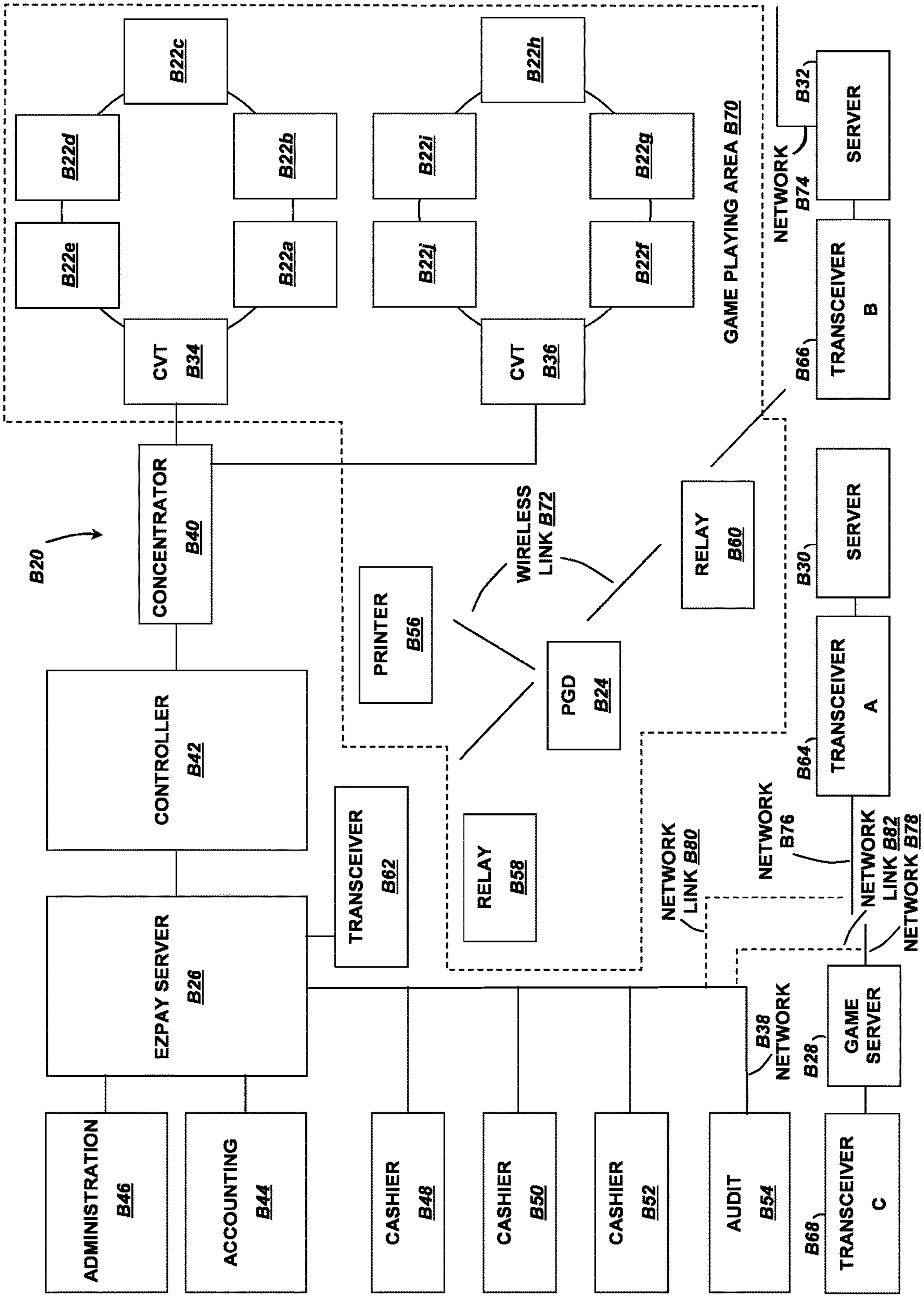
FIG. 8 is a block diagram of a gaming system in accordance with some embodiments.

FIG. 8 is a block diagram of a gaming system in accordance with various embodiments.

As illustrated, the gaming system B20 includes a plurality of gaming machines B22*a*, B22*b*, B22*c*, B22*d*, B22*e*, B22*f*, B22*g*, B22*h*, B22*i*, B22*j*. In some embodiments, these gaming machines B22*a*, B22*b*, B22*c*, B22*d*, B22*e*, B22*f*, B22*g*, B22*h*, B22*i*, B22*j* are of the stationary type. In general, the gaming machines B22*a*, B22*b*, B22*c*, B22*d*, B22*e*, B22*f*, B22*g*, B22*h*, B22*i*, B22*j* are arranged to present one or more games to a player. In various embodiments, the games are of the type requiring the placement of a wager or bet and are of the type by which a player receiving a winning outcome is provided an award, such as a monetary award. These devices may comprise, for example, video poker and slot machines. In addition, the gaming system B20 includes one or more hand-held, portable gaming devices (PGDs) B24. The PGD B24 is also arranged to present one or more games to a player, and as described below, may be used as an access point for a variety of other services. The device referred to herein as a "personal gaming device" may be referred to by other terminology, such as a portable gaming interface, personal game unit or the like, but regardless of the name of the device, such may have one or more of the characteristics herein.

In addition, in various embodiments, the PGD B24 is in communication with at least one gaming server B28. As described below, in various embodiments, the one or more games which are presented via the PGD B24 to the player are provided by the gaming server B28.

The gaming machines B22*a*, B22*b*, B22*c*, B22*d*, B22*e*, B22*f*, B22*g*, B22*h*, B22*i*, B22*j* and each PGD B24 is in communication with a payment system referred to herein as the "EZ-Pay" system. This system includes a server B26 for receiving and transmitting information. In general, the EZ Pay system is utilized to accept payment from a player for the playing of games and obtaining of other goods and services, and for paying a player winnings or awards.

In the embodiments illustrated, the gaming system B20 includes other servers B30, B32 for transmitting and/or receiving other information. In some embodiments, one server B30 comprises a prize transaction server. Another server B32, comprises a food transaction server. In some embodiments, information may be transmitted between the PGD B24 and these servers B30, B32.

The EZ Pay system, according to various embodiments, will now be described in more detail with reference to FIG. 9. The EZ Pay system may constitute an award ticket system which allows award ticket vouchers to be dispensed in lieu of the traditional coin awards or reimbursements when a player wins a game or wishes to cash out. These tickets may also be used by gaming machines and other devices for providing value, such as for payment of goods or services including as a bet or ante for playing a game.

Figure 9:
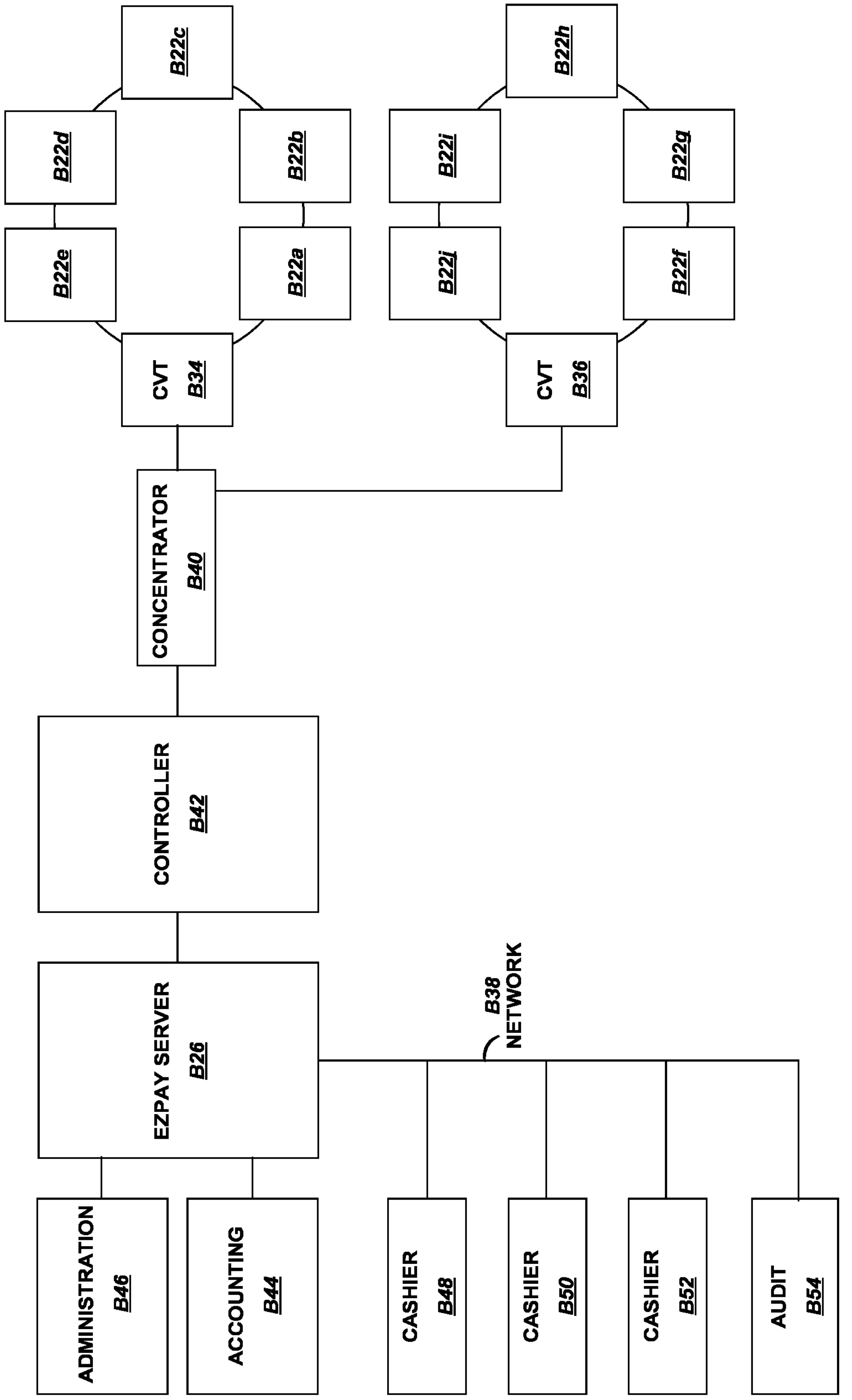
FIG. 9 is a block diagram of a payment system forming a part of the gaming system illustrated in FIG. 8, according to some embodiments.

FIG. 9 illustrates some embodiments of such a system in block diagram form. As illustrated, a first group of gaming machines B22*a*, B22*b*, B22*c*, B22*d*, and B22*e* is shown connected to a first clerk validation terminal (CVT) B34 and a second group of gaming machines B22*f*, B22*g*, B22*h*, B22*i*, and B22*j* is shown connected to a second CVT B36. All of the gaming machines print ticket vouchers which may be exchanged for cash or accepted as credit or indicia in other gaming machines. When the CVTs B34,B36 are not connected to one another, a ticket voucher printed from one gaming machine may only be used as indicia of credit in another gaming machine which is in a group of gaming machines connected to the same CVT. For example, an award ticket printed from gaming machine B22*a* might be used as credit of indicia in gaming machines B22*b*, B22*c*, B22*d*, and B22*e*, which are connected to the common CVT B34, but may not be used in gaming machines B22*f*, B22*g*, B22*h*, B22*i*, and B22*j* since they are each connected to the CVT B36.

The CVTs B34,B36 store ticket voucher information corresponding to the outstanding ticket vouchers that are waiting for redemption. This information is used when the tickets are validated and cashed out. The CVTs B34,B36 store the information for the ticket vouchers printed by the gaming machines connected to the CVT. For example, CVT B34 stores ticket voucher information for ticket vouchers printed by gaming machines B22*a*, B22*b*, B22*c*, B22*d*, and B22*e*. When a player wishes to cash out a ticket voucher and the CVTs B34,B36 are not connected to one another, the player may redeem a voucher printed from a particular gaming machine at the CVT associated with the gaming machine. To cash out the ticket voucher, the ticket voucher is validated by comparing information obtained from the ticket with information stored with the CVT. After a ticket voucher has been cashed out, the CVT marks the ticket as paid in a database to prevent a ticket voucher with similar information from being cashed multiple times.

Multiple groups of gaming machines connected to the CVTs B34,B36 may be connected together in a cross validation network B38. The cross validation network typically comprises one or more concentrators B40 which accept input from two or more CVTs and enables communications to and from the two or more CVTs using one communication line. The concentrator B40 is connected to a front end controller B42 which may poll the CVTs B34,B36 for ticket voucher information. The front end controller B42 is connected to an EZ pay server B26 which may provide a variety of information services for the award ticket system including accounting B44 and administration B46.

The cross validation network allows ticket vouchers generated by any gaming machine connected to the cross validation network to be accepted by other gaming machines in the cross validation network B38. Additionally, the cross validation network allows a cashier at a cashier station B48, B50, B52 to validate any ticket voucher generated from a gaming machine within the cross validation network B38. To cash out a ticket voucher, a player may present a ticket voucher at one of the cashier stations B48, B50, B52. Information obtained from the ticket voucher is used to validate the ticket by comparing information on the ticket with information stored on one of the CVTs B34,B36 connected to the cross validation network B38. As tickets are validated, this information may be sent to another computer B54, providing audit services.

As described above, the gaming system B20 may also include one or more hand-held PGDs B24. In various embodiments, the PGD B24 is a portable device capable of transmitting and receiving information via a wireless communication link/network.

Referring again to FIG. 8, the gaming system B20 may include a printer B56, wireless communication relays B58 and B60, and wireless transceivers B62, B64, B66 and B68 connected to the remote transaction servers B26, B28, B30 and B32. In various embodiments, a player may obtain the PGD B24, and after being provided with the appropriate authority, may play one or more games and/or obtain other services including food services or accommodation services.

Figure 10:
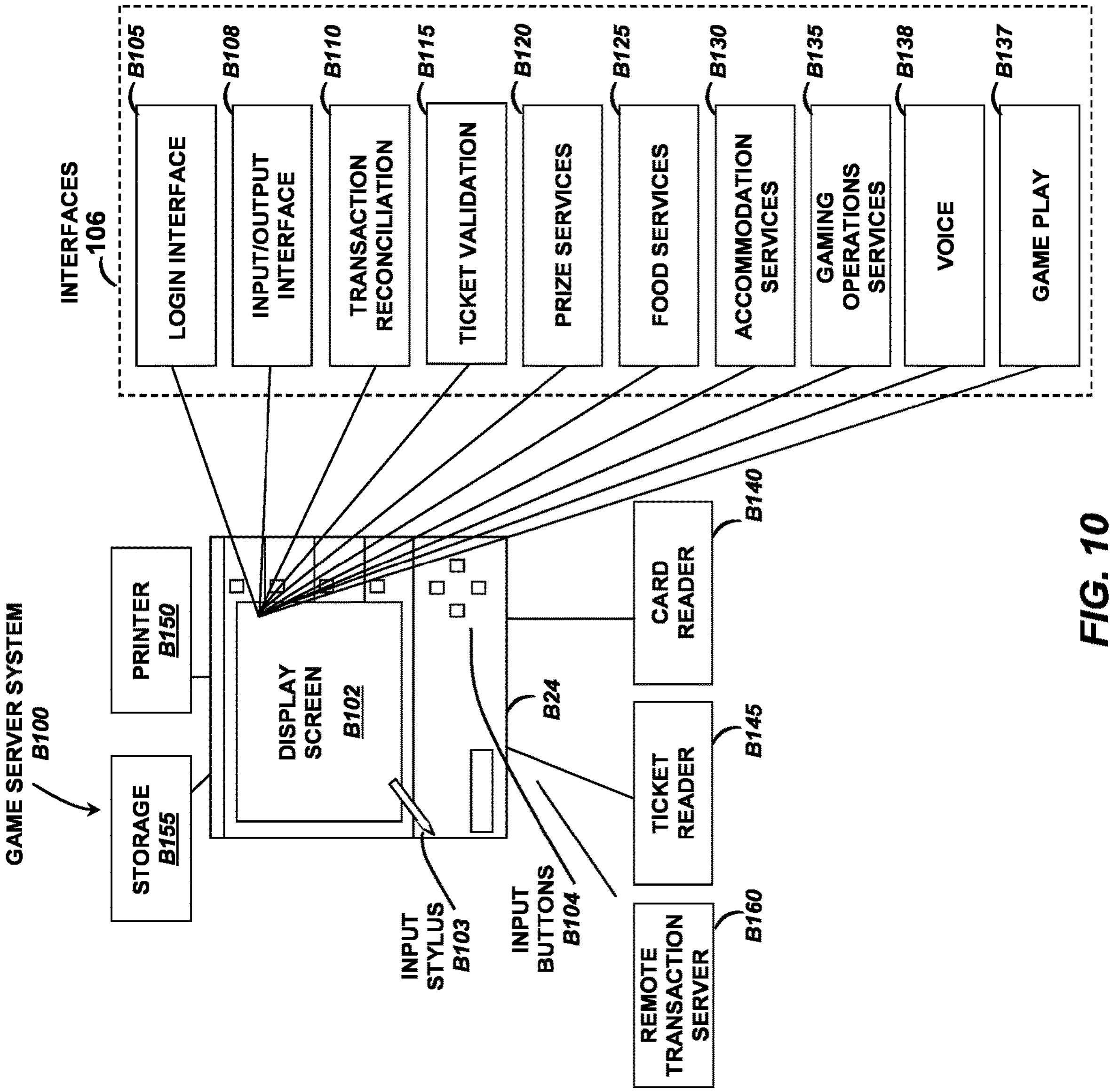
FIG. 10 is a schematic diagram of a portable gaming device of the gaming system illustrated in FIG. 8, according to some embodiments.

FIG. 10 illustrates the PGD B24 and a block diagram of a game and service system which may be implemented by the gaming system B20 illustrated in FIG. 8. In various embodiments, the game and service system B100 is comprised of at least one PGD B24 and a number of input and output devices. The PGD B24 is generally comprised of a display screen B102 which may display a number of game service interfaces B106. These game service interfaces B106 are generated on the display screen B102 by a microprocessor of some type (not shown) within the PGD B24. Examples of a hand-held PGD B24 which may accommodate the game service interfaces B106 shown in FIG. 10 are manufactured by Symbol Technologies, Incorporated of Holtsville, N.Y. The interface or menu data may be stored in a local memory, or the data may be transmitted to the PGD B24 from a remote location (such as a data server). This reduces the memory requirement of the device.

The game service interfaces B106 may be used to provide a variety of game service transactions and gaming operations services, including the presentation for play by a user of one or more games. The game service interfaces B106, including a login interface B105, an input/output interface B108, a transaction reconciliation interface B110, a ticket validation interface B115, a prize services interface B120, a food services interface B125, an accommodation services interface B130, a gaming operations interface B135, and a game play interface B137 may be accessed via a main menu with a number of sub-menus that allow a game service representative or player to access the different display screens relating to the particular interface.

In one or more embodiments, some or all of the interfaces may be available to a user of the PGD B24. For example, in one or more embodiments, the PGD B24 may have a dual purpose of both being usable by a player to play games and engage in other activities, and also be used by gaming operations personnel for use in providing services to players and performing administrative functions. In various embodiments, certain PGDs B24 may be specially configured for use only by players, and other PGDs B24 may be specially configured for use only by gaming or other personnel. In such event, the interfaces B106 may be custom programmed.

In one or more embodiments, only certain interfaces B106 may be displayed, depending on the status of the user of the PGD B24. In some embodiments, the particular interfaces B106 which are displayed and thus accessible for use are determined by the status of the user as indicated through a login function. In various embodiment, when the PGD B24 is operable (such as when a power button is activated) the default status for the PGD B24 is the display of the login interface B105. Once a user of the PGD B24 has logged in, then the status of the PGD display is changed.

In one or more embodiments, the login interface B105 may allow a game service representative to enter a user identification of some type and verify the user identification with a password. When the display screen B102 is a touch screen, the user may enter the user/operator identification information on a display screen comprising the login interface B105 using an input stylus B103 and/or using one or more input buttons B104. Using a menu on the display screen of the login interface, the user may select other display screens relating to the login and registration process. For example, another display screen obtained via a menu on a display screen in the login interface may allow the PGD B24 to scan a fingerprint of the game service representative for identification purposes or scan the fingerprint of a game player.

In the event a user identifies themselves as a gaming operator or representative, then the PGD B24 may be arranged to display one or more other interfaces such as those listed above and described in detail below. In one or more embodiments, the default status or login may be a "player" mode login.

In various embodiments, the login interface B105 may allow a player to identify themselves to configure the PGD B24 to permit the player to access a plurality of player services, such as playing games and the like. In various embodiments, the login interface B105 includes a request that the user identify themselves as a "player" or "authorized personnel." In the event "authorized personnel" is selected, then the above-referenced user identification (including password) may be requested. If "player" is selected, then in various embodiments the player is requested to provide an EZ pay ticket. As described in more detail below, in various embodiments, a player who wishes to play one or more games or obtain other goods or services uses an EZ pay ticket to provide the credit or payment therefor. The ticket may be obtained from a cashier or by play of another gaming device (such as devices B22*a*, B22*b*, B22*c*, B22*d*, B22*e*, B22*f*, B22*g*, B22*h*, B22*i*, B22*j* in FIG. 8). The ticket may be verified through the EZ pay system described above. In various embodiments, the PGD B24 includes a ticket reader B145 and a card reader B140. In some embodiments, the ticket reader B145 may be of a variety of types. In some embodiments, the reader comprises a bar-code reading optical scanner. In this arrangement, a user of the PGD B24 may simply pass the bar-coded ticket in front of the bar-code reader. In some embodiments, the card reader B140 comprises a magnetic-stripe card type reader for reading information associated with a magnetic stripe of a card, such as a player tracking card.

After having provided the appropriate authorization, access may be provided to the user of the PGD B24 of one or more of the following interfaces B106.

In one or more embodiments, an authorized user may be provided with access to the input/output interface B108. In a various embodiments, such access is only provided to a game service operator and not a player. In one or more embodiments, the input/output interface B108 permits a user to select from a list of devices stored in memory on the PGD B24, a device from which the PGD may input game service transaction information or output game service transaction information. For example, the PGD B24 may communicate with the ticket reader B145. As another example, the PGD B24 may input information from the card reader B140. Such input may be useful, for example, if a game service operator wishes to verify the authenticity of a player tracking card or the like.

The PGD B24 may output game and service transaction information to a number of devices. For example, to print a receipt, the PGD B24 may output information to a printer B150. In this game service transaction, the PGD B24 may send a print request to the printer B150 and receive a print reply from the printer B150. The printer B150 may be a large device at some fixed location, or a portable device carried by the game service representative. As another example, the output device may be the card reader B140 that is able to store information on a magnetic card or smart card. Other devices which may accept input or output from the PGD B24 are personal digital assistants, microphones, keyboard, storage devices, gaming machines and remote transaction servers.

The PGD B24 may communicate with the various input mechanisms and output mechanisms using both wire and wire-less communication interfaces. For example, the PGD B24 may be connected to the printer B150 by a wire connection of some type. However, the PGD B24 may communicate with a remote transaction server B160 via a wire-less communication interface including a spread spectrum cellular network communication interface. An example of a spread spectrum cellular network communication interface is Spectrum 24 offered by Symbol Technologies of Holtsville, N.Y., which operates between about 2.4 and 2.5 Gigahertz. The information communicated using the wire-less communication interfaces may be encrypted to provide security for certain game service transactions such as validating a ticket for a cash payout. Some devices may accommodate multiple communication interfaces. Such a spread spectrum network is but one possible communication scheme.

Another type of interface that may be stored on the PGD B24 is the award ticket validation interface B115. In some embodiments, this interface is only available to an authorized game service representative, and not a player. Some embodiments of the award ticket interface B115 may accommodate the EZ pay ticket voucher system and validate EZ pay tickets as previously described. However, when other ticket voucher systems are utilized, the award ticket validation interface B115 may be designed to interface with the other ticket voucher systems. Using the award ticket validation interface B115, a game service representative may read information from a ticket presented to the game service representative by a game player using the ticket reader and then validate and pay out an award indicated on the ticket.

In various embodiments, the award ticket contains game service transaction information which may be verified against information stored on a remote transaction server B160. To validate the ticket may require a number of game service transactions. For example, after obtaining game service transaction information from the award ticket, the PGD B24 may send a ticket validation request to the remote transaction server B160 using the spread spectrum communication interface and receive a ticket validation reply from the remote server B160. In particular, the validation reply, and the validation request may be for an EZ pay ticket. After the award ticket has been validated, the PGD B24 may send a confirmation of the transaction to the remote server B160. Details of the game service transaction information validation process are described with the reference to FIG. 12. In various embodiments, the award ticket interface may be configured to validate award information from a smart card or some other portable information device or validate award information directly from a gaming machine.

As game and service transactions are completed, game and service transaction information may be stored on a storage device B155. The storage device B155 may be a remote storage device or a portable storage device. The storage device B155 may be used as a back-up for auditing purposes when the memory on the PGD B24 fails and may be removable from the PGD B24.

A type of game service interface that may be stored on the PGD B24 is the prize service interface B120. As an award on a gaming machine (i.e., machines B22*a*, B22*b*, B22*c*, B22*d*, B22*e*, B22*f*, B22*g*, B22*h*, B22*i*, B22*j* in FIG. 8) or while playing a game via the PGD B24, a game player may receive a ticket (such as issued by other machine) that is redeemable for merchandise including a bicycle, a computer or luggage or receive such an award directly (such as while playing the PGD B24 itself). Using the prize service interface B120, a game service representative or player may validate the prize service ticket and then check on the availability of certain prizes. For example, when the prize service ticket indicates the game player has won a bicycle, the game service representative may check whether the prize is available in a nearby prize distribution center. Alternatively, a player may be permitted to do the same thing. In some embodiments, a player may be awarded a prize of a particular level, there being one or more particular prizes on that level. In such events, the player may use the interface B120 to determine what prizes are currently available in the prize level just awarded. The PGD B24 may validate a prize ticket and check on the availability of certain prizes by communicating with a remote prize server. Further, the game service representative may have the prize shipped to a game player's home or send a request to have the prize sent to a prize distribution location. The game service transactions needed to validate the prize ticket including a prize validation request and a prize validation reply, to check on the availability of prizes and to order or ship a prize may be implemented using various display screens located within the prize interface. The different prize screens in the prize service interface B120 may be accessed using a menu located on each screen of the prize service interface. In some embodiments, the prize service interface B120 may be configured to validate prize information from a smart card or some other portable information device or validate award information directly from a gaming machine.

A type of game service interface that may be stored on the PGD B24 is the food service interface B125. As an award on a gaming machine or as compensation for a particular amount of game play, a game player may receive a free food or drink. Using the food service interface B125, the player may redeem the food or drink award, or a game service representative may validate such an award (for example, the award may be provided to a player of a gaming device B22*a* in the form of a ticket) and check on the availability of the award. For example, when the game player has received an award ticket valid for a free meal, the food service interface may be used to check on the availability of a dinner reservation and make a dinner reservation. As another example, the PGD B24 may be used to take a drink or food order by the player thereof. Such an order may be processed via the remote food server B32 (see also FIG. 8). The transactions needed to validate a food ticket or award, to check on the availability of food services, request a food service and receive a reply to the food service request may be implemented using various display screens located within the food service interface B125. These display screens may be accessed using a menu located on each screen of the food service interface. In some embodiments, the food service interface may be configured to validate food service information from a smart card or some other portable information device.

Another type of game service interface that may be stored on the PGD B24 is an accommodation service interface B130. As an award for game play or as compensation for a particular amount of game play, a game player may receive an award in the form of an accommodation service such as a room upgrade, a free night's stay, or other accommodation prize. Using the accommodation service interface B130, the player may check on the availability of certain accommodation prizes. For example, when the game player has received an award for a room upgrade, the accommodation service interface may be used to check on the availability of a room and to make a room reservation. Regardless of whether the player has won an accommodation award, the player may utilize the accommodation service interface B130 to reserve a room (such as an additional night's stay) or an upgrade to a room. In some embodiments, a player of a game may be issued a ticket (such as from a free-standing game device B22*a*, B22*b*, B22*c*, B22*d*, B22*e*, B22*f*, B22*g*, B22*h*, B22*i*, B22*j* in FIG. 8), and a gaming representative may use the accommodation service interface B130 in order to validate the player's award ticket and check on the availability of the award and institute the award. As another example, the PGD B24 may be used to order a taxi or some other form of transportation for a player at a gaming machine preparing to leave the game playing area. The game playing area may be a casino, a hotel, a restaurant, a bar or a store.

The PGD B24 may validate the accommodation service award and check on the availability of certain accommodation awards by communicating with a remote accommodation server. The transactions needed to validate the accommodation ticket, check on the availability of accommodation services, request an accommodation service and receive a reply to the accommodation service request may be implemented using various display screens located within the accommodation service interface. These display screens may be accessed using a menu located on each screen of the accommodation service interface. In some embodiments, the accommodation service interface may be configured to validate accommodation service information from a smart card or some other portable information device.

A type of game service interface that may be stored on the PGD B24 is a gaming operations service interface B135. Using the gaming service interface B135 on the PGD B24, a game service representative may perform a number of game service transactions relating to gaming operations. For example, when a game player has spilled a drink in the game playing area, a game service representative may send a request to maintenance to have someone clean up the accident and receive a reply from maintenance regarding their request. The maintenance request and maintenance reply may be sent and received via display screens selected via a menu on the screens of the gaming operations service interface. As another example, when a game service representative observes a damaged gaming machine such as a broken light, the game service representative may send a maintenance request for the gaming machine using the PGD B24. In one or more embodiments, a player may be permitted various options through the gaming service interface B135. For example, a player may be permitted to request a gaming service representative or attendant using the interface B135.

A type of game service interface that may be stored on the PGD B24 is a transaction reconciliation interface B110. In various embodiments, the PGD B24 contains a memory storing game service transaction information. The memory may record the type and time when a particular game service transaction is performed. At certain times, the records of the game service transactions stored within the PGD B24 may be compared with records stored at an alternate location. For example, for an award ticket validation, each time an award ticket is validated and paid out, a confirmation is sent to a remote server B160. Thus, information regarding the award tickets, which were validated and paid out using the PGD B24, should agree with the information regarding transactions by the PGD stored in the remote server B160. The transaction reconciliation process involves using the transaction reconciliation interface B110 to compare this information. In various embodiments, only a gaming service representative (and not a player) is permitted access to the transaction reconciliation interface B110.

A type of game service interface that may be stored on the PGD B24 is a voice interface B138. Using the spread spectrum cellular or other communication network incorporated into the PGD, a player and/or game service representative may use the PGD B24 as a voice communication device. This voice interface B138 may be used to supplement some of the interfaces previously described. For example, when a game player spills a drink the game service representative may send maintenance request and receive a maintenance reply using the voice interface B138 on the PGD B24. As another example, when a game player requests to validate a food service such as free meal, such a request may be made by the player or a game service representative at a restaurant or other location using the voice interface B138 on the PGD B24. In some embodiments, a player may be permitted to contact a player of another PGD B24, such as by inputting a code number assigned to the PGD B24 through which communication is desired. Such would permit, for example, a husband and wife using two different PGDs B24 to communicate with one another. The voice interface B138 may also permit a player to contact the front desk of a hotel/casino, an operator of a switchboard at the gaming location or the like.

A type of game service interface that may be stored on the PGD B24 is a game play interface B137. In various embodiments, a player is permitted to access the game play interface B137 in order to select from one or more games for play. The gameplay interface B137 may include a menu listing one or more games which the player may play via the PGD B24. In various embodiments, game play is facilitated with the game server B28 (see FIG. 8).

In one or more embodiments, the gaming control code is not resident at the PGD B24, but instead at a secure, remote server. Referring to FIG. 8, game play data is transmitted from the game server B28 to the PGD B24, and from the PGD B24 to the game server B28. Preferably, the PGD B24 is adapted to receive and process data, such as by receiving video data and processing the data to present the information on the display B102. Likewise, the PGD B24 is arranged to accept input and transmit that input or instruction to the game server B28. This arrangement has the benefit that nearly all aspects of the play of a game can be monitored, as it requires the game play data to pass to or from a remote location. This avoids, for example, storage of the gaming software at the PGD B24 where it might be tampered with, copied or the like.

In one or more embodiments, each PGD B24 has a unique identifier which is utilized to identify which PGD B24 data is transmitted from and to which data is to be transmitted to. In some embodiments, the game server B28 may thus be used to present the same or different games to a plurality of players using different PGDs B24, with the game data regarding a particular game being played at a particular PGD B24 being directed to that PGD B24 using its particular identifier.

As will be appreciated by those of skill in the art, the PGD B24 may have a variety of configurations. As stated above, the PGD B24 may be used in the gaming system B20 in which gaming code is not stored directly at the PGD. In such an embodiment, the PGD B24 may have a much more limited amount of data memory. In some embodiments, the PGD B24 includes a processor for executing control code, such as that necessary to operate the display B102, accept input from the stylus B103 or input buttons B104 or the like. In addition, the PGD B24 preferably includes a buffer memory for accepting data transmitted from the game server B28. This data may comprise data for displaying game information, such as video and sound content.

Various aspects of the use of the PGD B24 described above will now be described. In one or more embodiments, the PGD B24 may be used directly by a player. In various embodiments, a player may use the PGD B24 to play one or more games, and obtain products and services, such as food.

Figure 11A:
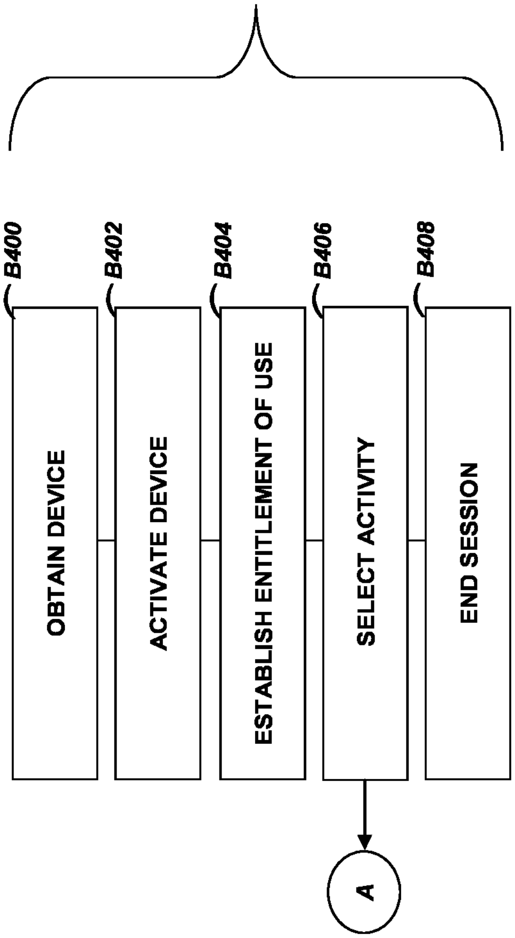
FIG. 11(*a*) is a flow diagram of a method of use of a portable gaming device by a player, according to some embodiments.
Figure 11B:
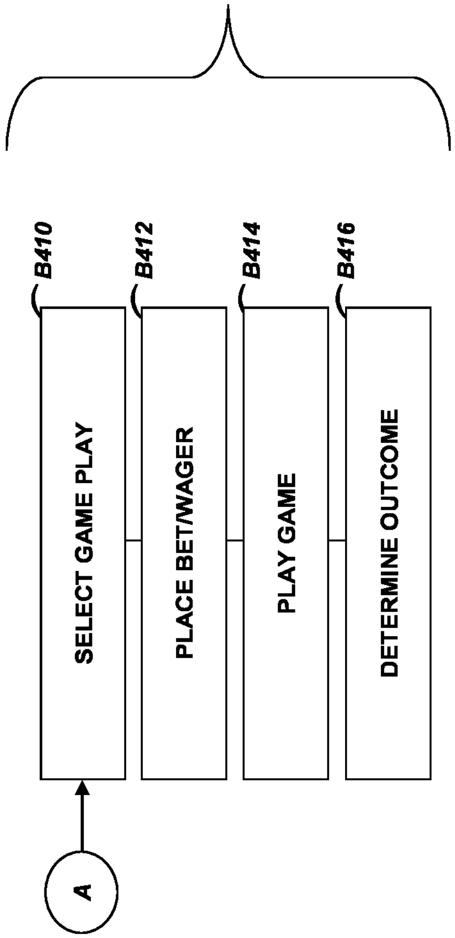

A method of use of the PGD B24, according to some embodiments, is illustrated in FIGS. 11(*a*) and 11(*b*). In general, a player must first obtain a PGD B24. For example, a player may check out a PGD B24 from a gaming operator. The player then establishes entitlement to use the PGD B24. In some embodiments, the player must indicate player status at the login interface and obtain a valid ticket in order to activate the PGD B24. Once activated, the player is permitted to engage in a variety of transactions using the interfaces B106, such as playing a game, redeeming prizes and awards, placing food and drink orders, placing reservations, seeking gaming operator support, and seeking a variety of other goods and services as described in more detail below.

One example of a method of use of the PGD B24 by a player will be described with reference to FIG. 11(*a*). In a first step B400, the player first obtains the PGD B24. In some embodiments, a gaming operator may have certain locations at which a player may obtain the PGD B24, such as the front desk of a hotel/casino, the hostess stand at a restaurant, from a gaming attendant or other location as desired. In some embodiments, a gaming operator may actually permit a player to retain the PGD B24, such as by renting, selling or giving the PGD B24 away to a player.

In a step B402, the PGD B24 is activated. In some embodiments, this step includes turning on the PGD B24 (such as with a power switch) and logging in. In some embodiments, when the PGD B24 is turned on, the login interface B105 is automatically displayed. The login interface B105 may include "player" and "authorized personnel" buttons which may be activated using the stylus B103. The player may indicate "player" status by selecting the player button with the stylus B103.

In some embodiments, the gaming operator may log the player in. For example, when a player obtains the PGD B24 from a hostess at a restaurant, the hostess may log in the player in player mode. In some embodiments, the gaming operator may have certain PGDs B24 which are for use by players and certain others which are for use by gaming personnel. In such event, the PGDs B24 which are configured for player status may automatically be configured for player mode after being turned on.

In a step B404, a player establishes entitlement to use the PGD B24. In some embodiments, this step comprises the player providing a valid ticket which is verifiable using the EZ pay portion of the gaming system B20. In some embodiments, a player may have obtained a ticket through play of a gaming machine, such as gaming machines B22*a*, B22*b*, B22*c*, B22*d*, B22*e*, B22*f*, B22*g*, B22*h*, B22*i*, B22*j* of the gaming system B20. In some embodiments, a player may be issued a ticket by a game service representative. For example, a player may provide credit at a cashier cage (such as with a credit card or cash) and be issued a ticket. A player may also pay cash or the like to a restaurant hostess and be issued a ticket.

Once the player has a ticket, the ticket may be scanned using the ticket reader B145 of the PGD B24. For example, the player may pass the ticket in front of the ticket reader B145. Once the information is read by the PGD B24, the data may be transmitted to the EZ pay server B26 for validation. Preferably, this validation confirms that the particular ticket is authorized, including the fact that it is outstanding and has value associated therewith.

In one or more embodiments, entitlement may be established in other manners. For example, in some embodiments, entitlement may be established with a player tracking or identification card which may be read using the card reader B140 of the PGD B24.

Establishing entitlement to use the PGD B24 may ensure that the player has funds for paying to obtain services and products available by use of the PGD B24. In one or more embodiments, however, this step may be eliminated. For example, in some embodiments, a player may be permitted to use the PGD B24 and then pay for goods or services in other manners. In some embodiments, a player may, for example, order food and then pay the server for the food using a room charge or cash at the time the food is delivered. In some embodiments, a player may use a credit card to pay to play games or to pay for food or the like. In such event, a credit card may be read by the card reader B140 at the time the services or products are to be provided or are ordered by the player.

In a step B406, the player is then permitted to select one or more selections from the interfaces B106. As stated above, a player may not be permitted access to all of the interfaces B106. In any event, a player may select, such as with the stylus B103, a service from the group of interfaces B106. An example of the engagement of a particular activity using the PGD B24 will be described below with reference to FIG. 11(*b*).

Once a player no longer desires to engage in any more activities using the PGD B24, the use session of the PGD B24 is ended in a step B408, and in one or more embodiments, the PGD B24 is returned to the gaming operator. In various embodiments, once a player no longer wishes to use the PGD B24, the player returns the PGD B24 to the gaming operator. At that time, the gaming operator may confirm that all transactions using the PGD B24 are closed or complete and pay the player any winnings. In some embodiments, a player B24 is issued a new ticket representing the player's credit (including any payments made in order to first use the PGD B24, plus any winnings, less any expenditures).

An example of a method of using the PGD B24 wherein the player has selected the option of game play using the game play interface B137 will be described in detail with reference to FIG. 11(*b*). In a step B410 (which step comprises a particular embodiment of step B406 of FIG. 11(*a*)), a player has selected the event or service of "game play" using the game play interface B137.

In some embodiments, when a player has selected the game play interface B137, a menu may be displayed to the player of the one or more games which the player may be permitted to play. In some embodiments, when the player selects the game play interface B137, a signal is transmitted from the PGD B24 to the remote game server B28 instructing the game server B28 that the player wishes to play a game. In response, the game server B28 may send the latest game menu to the PGD B24 for display. In this arrangement, the menu of games which is available may be continuously updated at one or more central locations (such as the server B28) instead of at each PGD B24.

If the system B20 permits the player to select a game from a menu of games, then the method includes the step of the player selecting a particular game to be played. Once a game is selected, or if only a single game option is provided, then game play begins. In some embodiments, the game server B28 transmits data to the PGD B24 for use by the PGD B24 in presenting the game, such as video and audio content.

In some embodiments, in a step B412 a player is required to place a bet or ante to participate in a game. In some embodiments, the player may place the bet or ante using the EZ pay system. As stated above, the player preferably establishes entitlement to use the PGD B24 with an EZ pay ticket or other entitlement, which ticket demonstrates that the player has monies or credits on account which may be used to pay for goods and services. These services include game play services.

In some embodiments, when the player establishes entitlement to use the PGD B24, the value of the player's credits or monies are displayed to the player so that the player is visually reminded of these amounts. When a player begins play of a game, the player may input a bet and ante which is no more than the value of the credits or monies which the player has on account. Once a player has placed a bet or ante, that information is transmitted to the EZ pay server B26 and is deducted from the player's account. A new credit value is then displayed at the PGD B24 to the player.

In various embodiments, a player may provide credit for a bet or ante in other manners. For example, a player may swipe a credit card through the card reader B140 in order to provide the necessary credit for the bet or ante.

In a step B414, the player is then permitted to engage in the game. In some embodiments, game play comprises the game server B28 executing game code and transmitting information to the PGD B24 for presenting certain aspects of the game to the player. When necessary, the player is permitted to provide input, and the input data is transmitted from the PGD B24 to the game server B28.

As one example of a game, the game may comprise video poker. In this embodiment, the game server B28 executes code for randomly generating or selecting five cards. Data representing video images of the cards is transmitted to the PGD B24, where the images of the five dealt cards are displayed on the display screen B102.

The instruction "draw" or "stay" may be displayed to the player. At that time, the player may select one or more of the cards to hold or replace. In the event the player elects to replace any card, that instruction is transmitted to the game server B28 which then randomly generates or selects replacement cards. The replacement card data is transmitted to the PGD B24 and images of the replacement cards are displayed.

In the event the hand of five cards (including any replacement cards) is determined by the game server B28 to comprise a predetermined winning hand, then the player may be paid a winning amount. If not, then the player loses his bet or ante. This step comprises step B416 of the method, that of determining the outcome of the game.

If the outcome is a winning outcome, then the player may be paid a winning by crediting the player's account through the EZ pay server B26. In that event, the player's credits value as displayed is updated to reflect the player's winnings.

A player may then elect to play the game again, play a different game, or select one or more other services offered. In some embodiments, a "return to main menu" button or the like may be displayed to the player at all times, permitting the player to return to a display including the various interfaces B106.

In some embodiments, when the player has completed use of the PGD B24, the player returns the PGD B24 to the gaming operator. For example, the player may return the PGD B24 to a cashier cage or a game service operator. In various embodiments, the game service operator or other party then issues the player a ticket for any credit or value which remains in the player's account. The PGD B24 may then be deactivated so that it readied for use by another player. In some embodiments, the PGD B24 may be deactivated by turning its power off. In some embodiments, a "logout" interface or option may be provided which causes the PGD B24 to return to a default state seeking the login of a player or user.

The PGD B24 may be used by a game service operator. Several examples of a method of such use are detailed below in conjunction with FIGS. 8 and 9.

When a game service representative contacts a game player seeking a game service in the game playing area B70 (see FIG. 8), the game service representative uses an appropriate game service interface on the display screen of the PGD B24, as described with reference to FIG. 10, to provide the game service requested by the game player. For example, when a game player requests an EZ pay ticket validation, the game service representative brings the EZ pay ticket validation interface onto the display screen of the PGD B24 using menus available on the display screen B102. Then, the game service representative scans the EZ pay ticket using a ticket reader connected to the PGD B24 to obtain unique ticket information. Next, the PGD B24 sends an EZ pay ticket validation request using the wire-less communication interface to the EZ pay server B26.

In various embodiments, the ticket validation request is composed of one or more information packets compatible with the wire-less communication standard being employed. Using a wireless link B72, the one or more information packets containing the ticket validation request are sent to the transceiver B62 connected to the EZ pay server. The transceiver B62 is designed to receive and send messages from the one or more PGDs B24 in the game playing area B70 in a communication format used by the PGDs. Depending on the location of the PGD B24 in the game playing area B70, the communication path for the information packets to and from the PGD B24 may be through one or more wire-less communication relays including B58 and B60. For example, when the PGD B24 is located near gaming machine B22*a*, the communication path for a message from the PGD B24 to the EZ pay server B26 may be from the PGD B24 to the relay B60, from the relay B60 to the relay B58, from the relay B58 to the transceiver B62 and from the transceiver B62 to the EZ pay server B26. As the location of the PGD B24 changes in the game playing area B70, the communication path between the PGD B24 and the EZ pay server B26 may change.

After receiving an EZ pay ticket validation reply from the EZ pay server B26, the EZ pay ticket may be validated using an appropriate display screen on the PGD B24. After cashing out the ticket, the game service representative may send a confirmation of the transaction to the EZ pay server B26 using the PGD B24. The transaction history for the PGD B24 may be stored on the PGD B24 as well as the EZ pay server B26. Next, a receipt for the transaction may be printed out. The receipt may be generated from a portable printer carried by the game server representative ad connected to the PGD B24 in some manner or the receipt may be generated from a printer B56 at a fixed location.

After providing a number of game services comprising a number of game service transactions to different game players in the game playing area B70 using the PGD B24, a game service representative may log-off of the PGD B24 and return it to location for secure storage. For example, at the end of a shift, the game service representative may check the PGD B24 at some of the locations, the device is unassigned to the particular game service representative and then may be assigned to another game service representative. However, before the PGD B24 is assigned to another game service representative, the transaction history stored on the PGD B24 may be reconciled with a separate transaction history stored on a transaction server such as the EZ pay server B26.

The assigning and unassigning of the PGD B24 to a game service representative and the transaction reconciliation are performed for security and auditing purposes. Another security measure which may be used on the PGD B24 is a fixed connection time between the PGD B24 and a transaction server. For example, after the PGD B24 has been assigned to a game service representative and the game service representative has logged on the PGD B24, the PGD B24 may establish a connection with one or more transaction servers including the EZ pay server B26, a server B28, a server B30, or a server B32. The connection between a transaction server and the PGD B24 allows the PGD B24 to send information to the transaction server and receive information from the transaction server. The length of this connection may be fixed such that after a certain amount of time the connection between the PGD B24 and the transaction server is automatically terminated. To reconnect to the transaction server, the login and registration process must be repeated on the PGD B24.

A transaction server may provide one or more game service transactions. However, the PGD B24 may connect with multiple transaction servers to obtain different game service transactions. For example, server B30 may be a prize transaction server allowing prize service transactions and server B415 may be a food transaction server allowing food service transactions. When a game service representative receives a prize service request from a game player, the PGD B24 may be used to contact the prize transaction server B30 using a wire-less communication link between the PGD B24 and a transceiver B64 connected to the prize transaction server B30. Similarly, when a game service representative receives a food service request from a game player, the PGD B24 may be used to contact the food transaction server B32 using a wire-less communication link between the PGD B24 and a transceiver B66 connected to the food transaction server B32.

The different transaction servers including the servers B26, B28, B30, B32 may be on separate networks or linked in some manner. For example, server B32 is connected to network B74, server B26 is connected to network B38, server B30 is connected to network B76, and server B28 is connected to network B78. In this embodiment, a network link B80 exists between network B76 and network B38. Thus, server B26 may communicate with server B30 via the network link B80. A communication link between different servers may allow the servers to share game service transaction information and allow different communication paths between the PGDs and the transaction servers. Likewise, a network link B82 exists between network B78 and network B38, permitting the game server to communicate with the EZ pay server B26.

Figure 12:
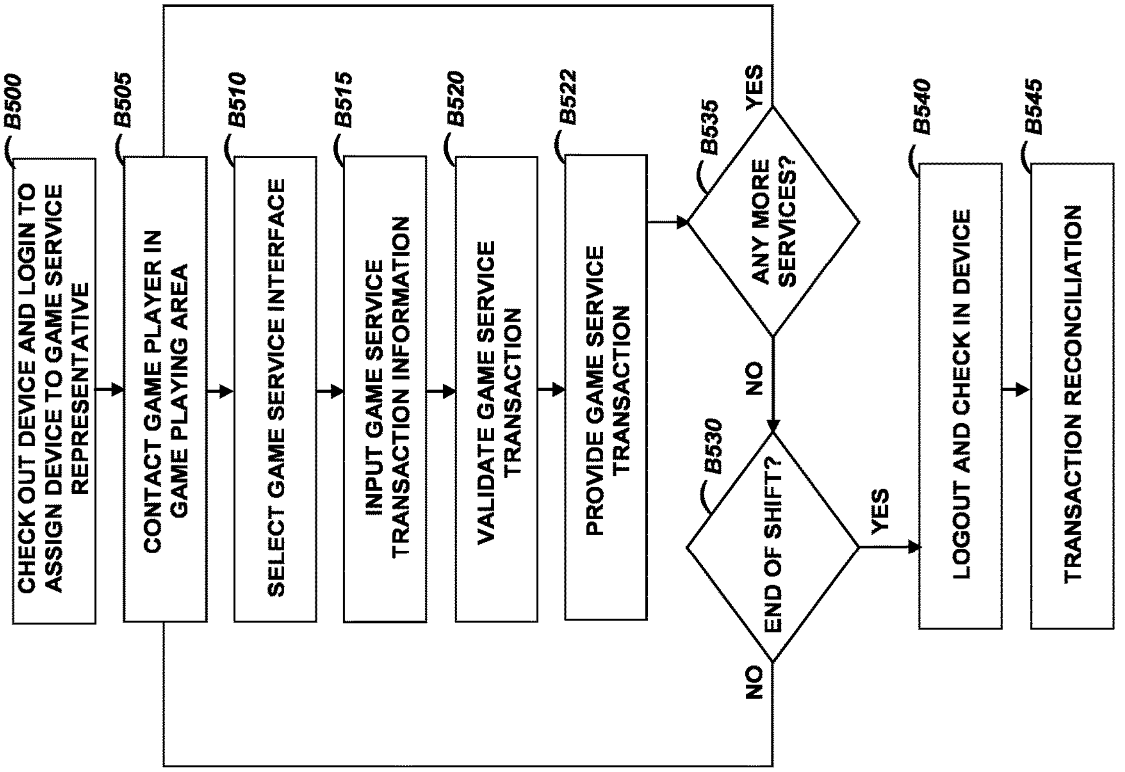
FIG. 12 is a flow diagram of a method of use of the portable gaming device by a gaming service operator, according to some embodiments.

FIG. 12 is a flow chart depicting a method for providing a game service using a hand-held device. In step B500, a game service representative receives the PGD B24 and logs in to the device to assign the device. The check out process and assign process are for security and auditing purposes. In a step B505, the game service representative contacts a game player in the game playing area requesting a game service of some type. In a step B510, the game service representative selects an appropriate interface on the PGD B24 using menus on the display screen B102 of the PGD that allow the game service representative to provide a requested game service. In a step B515, the game service representative inputs game service transaction information required to perform a game service transaction. For example, to validate an award ticket, the game service representative may read information from the ticket using a ticket reader. As another example, to provide a food service including dinner reservation, the game service representative may enter a game player's name to make the reservation.

In a step B520, the transaction information obtained in step B515 is validated as required. For example, when a player attempts to cash out an award ticket, the information from the award is validated to ensure the ticket is both genuine (e.g. the ticket may be counterfeit) and has not already been validated. The validation process requires a number of transfers of information packets between the PGD B24 and the transaction server. The details of the validation process for an award ticket validation are described with reference to FIG. 13. When the transaction information is valid, in a step B522, a game service transaction is provided. For example, a room reservation may be made for a player requesting an accommodation service. A confirmation of the game service transaction may be sent to the transaction server for transaction reconciliation in a step B545. In one or more embodiments, the method may include the step of generating a receipt regarding the game service transaction.

In a step B535, after providing the service, a game player may request another game service. When a game player requests an additional game service, the game service representative returns to step B510 and selects an appropriate interface for the game service. When a game player does not request an additional service and it is not the end of a shift, in a step B530, the game service representative returns to step B505 and contacts a new game player. In a step B540, when a shift has ended, the game service representative logs out of the PGD B24 and checks the device at a secure location so that the PGD may be assigned to a different game service representative. In step B545, before the PGD B24 is assigned to a different game service representative, a transaction history reconciliation is performed to ensure that the transaction history stored on the PGD is consistent with the transactions previously confirmed with a transaction server during the game service representative's shift. The transaction history on the PGD B24 may be stored on a removable memory storage device on the PGD. Thus, the memory may be removed from the device for transaction reconciliation and replaced with a new memory. Thus, the device with the new memory may be assigned to a new game service representative while the transaction history from the previous game service representative assigned to the device is reconciled.

Figure 13:
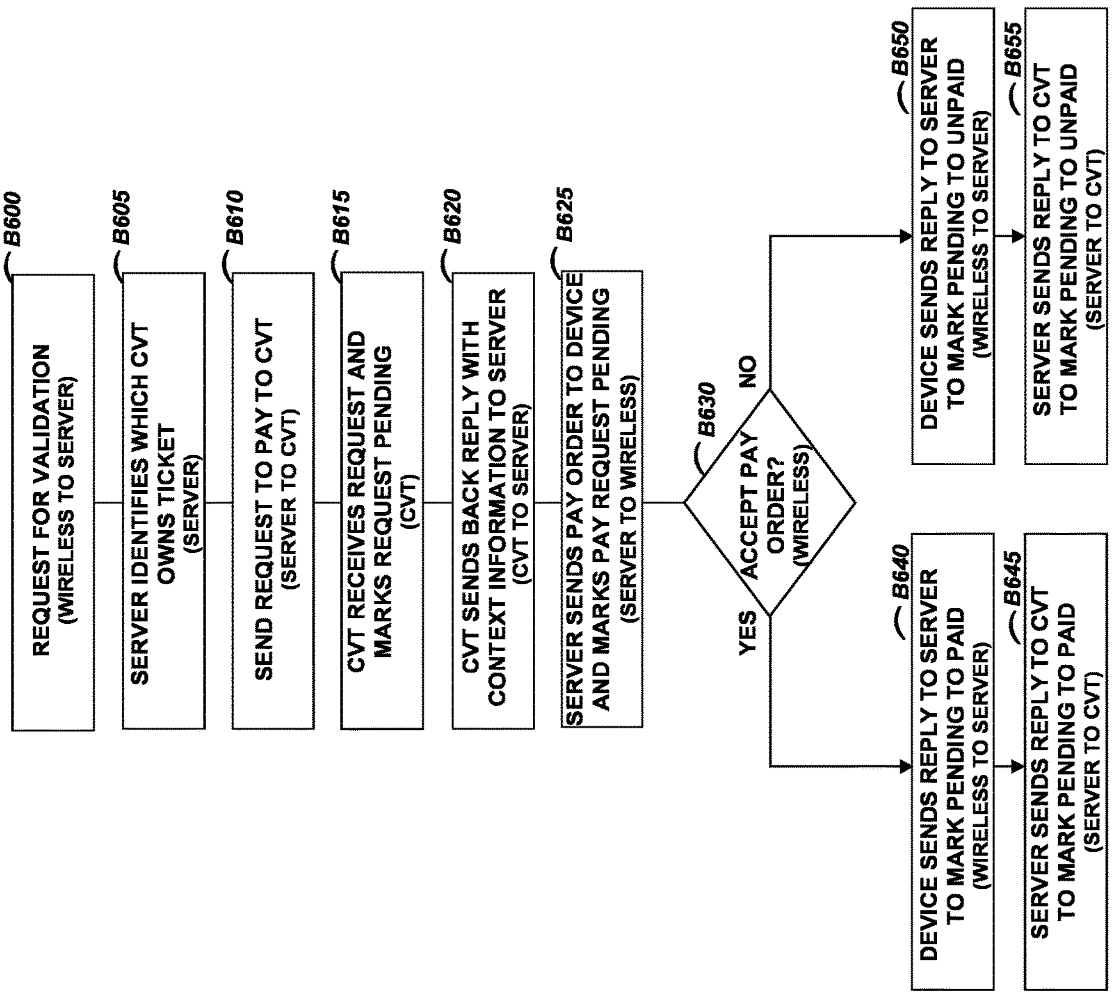
FIG. 13 is a flow diagram of a method of use of the portable gaming device according to some embodiments.

FIG. 13 is a flow chart depicting a method for validating information for providing a personal game service. In the embodiment shown in the figure, a ticket is validated in a manner consistent with an EZ pay ticket system. The EZ pay ticket is usually used for award tickets. However, the system may be adapted to provide tickets for other services include food services, prize services or accommodation services. In a step B600, a request for game service transaction information read from a ticket is sent via a wire-less communication interface on the PGD B24 to the appropriate transaction server as described with reference to FIG. 8. In a step B605, the server identifies which clerk validation ticket (CVT) B34,B36 owns the ticket. When a CVT owns a ticket, the CVT has stored information regarding the status of a particular ticket issued from a gaming machine connected to the CVT B34,B36. In a step B610, the server sends a request to pay the ticket to the CVT identified as the owner of the ticket. Typically, the pay request indicated a service on the ticket has been requested. For a cash ticket, a pay request means a request to cash out the ticket has been made. For a free meal, a pay request means a request to obtain the meal has been made. In a step B615, the CVT receives the pay request for the ticket and marks the ticket pending. While the ticket is pending, any attempts to validate a ticket with similar information is blocked by the CVT.

In a step B620, the CVT B34,B36 sends back a reply with context information to the server. As an example, the context information may be the time and place when the ticket was issued. The information from the CVT to the server may be sent as one or more data packets according to a communication standard shared by the CVT and server. In a step B625, after receiving the validation reply from the CVT, the server marks the pay request pending and sends a pay order to the PGD B24. While the pay request is pending, the server will not allow another ticket with the same information as the ticket with the pay request pending to be validated.

In a step B630, the game service representative may choose to accept or reject the pay order form the server. When the game service representative accepts the pay order from the server, in a step B640, the PGD B24 sends a reply to the transaction server confirming that the transaction has been performed. The transaction server marks the request paid which prevents another ticket with identical information from being validated. In a step B645, the server sends a confirmation to the CVT which allows the CVT to mark the request from pending to paid. When the game service representative rejects the pay order from the server, in a step B650, the PGD B24 sends a reply to the server to mark the pay request from pending to unpaid. When the ticket is marked unpaid, it may be validated by another PGD B24 or other validation device. In a step B655, the server sends the reply to the CVT to mark the pay request from pending to unpaid which allows the ticket to be validated.

In one or more embodiments of the invention, a ticket may be used to provide credit/value for establishing entitlement to a service or a good, such as the right to play a game or obtain food. The PGD B24 may include a card reader B140. In such an arrangement, a user of the PGD B24 may use a credit card or other magnetic stripe type card for providing credit/value. In various embodiments, the PGD B24 may include one or more other types of devices for obtaining/receiving information, such as a smart card reader. In such arrangements, the PGD B24 device may read information from the credit card, smart card, or other device. These cards may comprise the well-known credit or debit cards. This information may be used to provide the credit/value. In the example of a credit card, the user's account information may be read from the card and transmitted from the PGD B24 to the controller B42. Credit card/credit validation information may be associated with a credit card server (not shown). This credit card server may be associated with a bank or other entity remote from the casino or place of use of the PGD B24 and the controller B42. A communication link may be provided between the controller B42 and remote server for sending credit card information there over.

In some embodiments, when a player utilizes a smart card or credit card the amount of associated credit or value may be transmitted to the EZ Pay server B26, and then the credited amount may be treated in exactly the same manner as if the credit/value had been provided by a ticket. When a player wishes to cash out, the EZ Pay server B26 has a record of the original amount credited and the amounts of any awards, losses, or payments, and may then issue the player a ticket representing the user's total credit.

In accordance with the invention, a gaming system is provided which includes one or more portable gaming devices. The portable gaming devices permit a player to play one or more games at a variety of locations, such as a hotel room, restaurant, or other location. These locations may be remote from traditional gaming areas where free-standing, generally stationary gaming machines are located.

In one or more embodiments, a player may use the portable gaming device to not only play games but obtain other products and services. In addition, in one or more embodiments, the portable gaming device may be used by game service representatives to perform a variety of functions and provide a variety of services to a player.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Wireless Interactive System

According to various embodiments, a wireless interactive gaming system includes one or more wireless gaming devices, a receiver, and a central processor. The wireless interactive gaming system may also include a terminal which is in communication with the central processor.

In a gaming environment that employs a wireless interactive gaming system, a player receives a wireless gaming device from a game official who represents a gaming establishment or the "house". The wireless gaming device is capable of receiving wager information as commands entered by the player and transmitting the received wager information along with identification information to the receiver by wireless transmission.

The wireless interactive gaming system may support a number of wireless gaming devices within one gaming establishment. The range for the wireless transmission from a wireless gaming device may be up to 100 feet.

According to various embodiments, a player inputs information into a wireless gaming device, e.g., by pressing push buttons or keys on the device. The wireless gaming device may include any number, e.g. from 5 to 20, of buttons in a keypad-type arrangement. Buttons may be marked with the digits 0 through 9 and may also include a "$" (dollar sign) key and an "enter" key, so that the player may easily input wager information. In various embodiments, the wireless gaming device includes at least eight player selection buttons (e.g., digits) and at least five special function buttons, (e.g., to request the player's balance). In various embodiments, the player can input some or all of the wager information into the wireless gaming device by swiping a smart card, which contains a microprocessor chip or a magnetic stripe with encoded information, through a smart card reader on the wireless gaming device.

In various embodiments, the wireless gaming device may include an identifier. The identifier may be, e.g., a series of alphanumeric characters, a bar code, or a magnetic stripe affixed to the device. In various embodiments, the identifier may be a digital code stored in a secure memory, e.g., an electronically erasable programmable read only memory (EEPROM). The identifier may thus be readable directly by the game official if it is a series of alphanumeric characters, or it may be read automatically by a bar code reader or a magnetic stripe reader. In various embodiments, the identifier may be programmed in EEPROM or read from EEPROM through an RS-232 port, which may be directly connected to encoder and decoder circuitry in a terminal.

A wireless gaming device may store an encryption key. The encryption key may be used to encrypt information that is transmitted to the receiver from the device. Encryption of the information transmitted to the receiver may limits tampering with the wireless gaming device and may prevent unauthorized or counterfeit devices from being used with the system.

In various embodiments, the encryption key may be stored in the EEPROM. The EEPROM may have the advantage of being a memory device which is difficult to access if the appropriate encoding circuitry is not available. Thus, it is contemplated that the encoding circuitry that downloads the encryption key into the device may be securely held by the game official.

Alternately, the encryption key stored in the EEPROM may be updated and changed for each player who receives a wireless gaming device by directly connecting the device to encoding and decoding circuitry in the terminal through a port at the time the wireless gaming device is delivered to the player. Moreover, other digital information related to the game being played may be downloaded from the terminal to the EEPROM through a direct connection with the wireless gaming device.

In various embodiments, a microprocessor controls the operation of a wireless gaming device. The microprocessor receives digital wager information entered by the player using buttons or keys of the wireless gaming device. The microprocessor stores an identification code associated with the wireless gaming device that is a digital equivalent of the identifier of the wireless gaming device. The microprocessor also executes software applications for encrypting the identification code and the player's wager information for transmission to the receiver. The software contains an algorithm that encrypts a data packet including the identification code and wager information using the encryption key.

In various embodiments, a wireless gaming device has a unique address, i.e. identification code, for communications with the receiver and stores a player identification that is programmed into the device by the central processor. The wireless gaming device may include a wager amount register, which is maintained and updated using the keys on the device. The value stored in the wager amount register may be included in transmissions from the device to the central processor. The value of the wager amount register may default to a predetermined value, e.g. $1, when the device is initialized, and can be further adjusted by the player. The wireless gaming device may also include an account balance register, which is maintained in the device and is updated by the central processor periodically. The value of the account balance register should default to $0 when the device is initialized.

The wireless gaming device may include player function keys. The player function keys may be used to accomplish the following functions:

1. Transmit a message to the receiver;
2. Request account balance information;
3. Adjust the state of the device;
4. Affect the data to be sent in the next transmitted message;
5. Increment the wager amount register by a predetermined amount, e.g., $10, $5 or $1;
6. Reset the wager amount register to the default value, e.g., $1.

The firmware of the wireless gaming device may only allow for one press of buttons or keys every 100 ms. In various embodiments, key presses are not queued; thus, when a key press message is queued to be sent, no other player input is accepted until the queued message has been sent.

The wireless gaming device may include a transmitter. The transmitter may receive encrypted digital information from the microprocessor and convert it to a signal for wireless transmission to the receiver. The transmitter transmits signals wirelessly, e.g., using radio frequency signals or infrared signals. Communications between the receiver and the wireless gaming device may be asynchronous at 2400 bits per second.

The wireless gaming device may include an identifying circuit that drives the transmitter to periodically send an identification signal to the receiver. The use of the identifying circuit permits the receiver and the central processor to be assured that the wireless gaming device is still active, functioning, and present in the gaming establishment. Thus, if the wireless gaming device were removed from the gaming establishment, the receiver and central processor would no longer receive and detect the periodic identification signal sent by the identifying circuit and the transmitter, and the game official may be alerted that the wireless gaming device has been removed from the gaming establishment.

The wireless gaming device may contain a real-time clock that permits the microprocessor to monitor the current time and date. The clock may consist of a timing circuit. The microprocessor can use the time and date information obtained from clock to perform calculations and other functions based on the current time and date.

The wireless gaming device may also include a tag, such as an electronic or magnetic component, which activates an alarm when passed through a sensing apparatus located at the entrance and/or exit of the gaming establishment. Activation of the alarm by passing the wireless gaming device with the tag through the sensing apparatus notifies the game official of an attempted removal of the wireless gaming device from the gaming establishment.

The wireless gaming device may be powered by a battery source contained within the device. A portable power source such as battery source permits extended cordless operation of the wireless gaming device throughout a gaming environment. The battery source may be part of a removable, rechargeable battery pack that allows the device to be recharged when it is not in use.

In some embodiments, the wireless gaming device displays information such as game information on a device display, such as a liquid crystal display (LCD) with a back-light. The LCD can be used to display the values stored in the wager amount register and in the account balance register. The wireless gaming device may include a display receiver which receives digital information transmitted from the receiver or from the central processor.

The device may also include a bicolor light emitting diode (LED). The bicolor LED is capable of displaying at least two colors, e.g., red and green. The green light may flash each time the wireless gaming device sends a transmission to the receiver, for a period of time to ensure that it is visible to the player. The red light may illuminate when a key is pressed on the wireless gaming device, and remain lit until the transmission is received by the receiver; no additional key entry will be enabled when the red light is lit. The wireless gaming device may also include additional light emitting diodes, for example to indicate when the account balance register is being updated and the balance information is being displayed on the LCD.

The receiver is capable of receiving signals transmitted from the transmitter in the wireless gaming device. The receiver contains a decoder, which converts the received signals, e.g., into digital information. This digital information contains at least the identification code of the wireless gaming device and the player's wager information. The receiver sends the digital information obtained by the decoder to the central processor. Communications between the central processor and the receiver may be by an RS-232 electrical interface data serial communications link, with communications being asynchronous at either 9600 or 19,200 bytes per second, in various embodiments.

The receiver may receive signals from many wireless devices either simultaneously or in rapid succession, e.g., using multiplexing techniques, so that many players can place wagers using their wireless gaming devices during a short time interval. The receiver differentiates signals received from the various devices by the identification codes which are present in the signals received by the receiver.

The central processor receives the identification code of a wireless gaming device and the player's wager information from the receiver. The central processor also decrypts this information using the encryption key. The central processor is capable of receiving data from multiple wireless gaming devices in an apparently simultaneous manner.

In various embodiments, an account for the player is stored in a database of the central processor. The database stores the monetary value of the balance of the account associated with the identifier of the wireless gaming device.

The central processor manages the player's account in the database based on signals received from the player's wireless gaming device as the player places wagers and when prizes are awarded during play of the game. The central processor subtracts money from the player's account balance when the player places a wager. The player's account balance may be automatically increased by the central processor when the player wins a game on which he has placed a wager.

The central processor also stores and is capable of executing software applications containing algorithms to calculate players' account balances, wagers, and winnings. The central processor should be able to execute all of the algorithms which define the actions performed on the players' accounts during the progress of the game, as wagers are entered, as winnings paid out, and when funds are added to the players' accounts.

Algorithms in the software in the central processor may also calculate odds and payouts for certain games, such as lottery-type games, during play of the game. The odds and payouts at a particular point in time may depend on the characteristics of the game being conducted by the central processor and may change as the game progresses. These algorithms may be executed by the central processor to provide exact calculations of the odds of specific game events occurring and the associated prizes for a player's correctly predicting the occurrence of one of those events. The algorithms may be executed continuously, so that real-time odds and payout can be calculated as the game progresses.

The central processor may perform various actions on players' accounts, resulting in various impacts on the accounts. For example, if the player wins a game, his account is credited for the payout based on his wager. If the player places a wager using the wireless gaming device, his account is debited by the amount of the wager. If the game official receives additional funds from the player, the balance of the player's account is credited by the amount of the funds. If the game official closes the player's account and disburses funds to him, the balance of the player's account is debited by the amount disbursed.

The central processor may be located in the gaming establishment that houses the receiver. In various embodiments, the central processor may be located remotely from the receiver, communicating with the receiver via electronic digital telephone communication or wireless transmission, such as a serial communication link. Additionally, the central processor may perform a multitude of functions for various receivers in a variety of gaming environments.

In some embodiments, communication among the central processor, the receiver, and the wireless gaming device involves a polling scheme. Polling enables many wireless gaming devices to communicate with a receiver without interference between them. Such a polling scheme may include the transmission of digital signals in the form of strings of hexadecimal characters. Preferably, all communications between the central processor, the receiver and the wireless gaming device are encrypted.

In such a polling scheme, hexadecimal characters may be reserved for specific control protocols. For example, an attention character is a header character used to begin all transmissions from the central processor to the receiver and serves to delineate messages and synchronize the receipt of messages in the receiver. The same function is implied when the attention character follows in response to a message transmission. An acknowledgement character is another header character which provides acknowledgement to the transmitting device that the previous message's data has been received and verified. The acknowledgement character can also function as an attention character to begin a subsequent message. An end of message character is used to indicate the end of a transmission. Also, a complement next byte character allows for use of reserved protocol characters within a normal transmission message by avoiding a false control signal when a message data byte matches one of the control characters. When a message byte that needs to be sent matches one of the protocol control characters, the complement next byte character is sent, followed by the one's complement of the matching message byte.

Verification of received data may be accomplished using a single byte checksum of the message information. This checksum may be the one's complement of the sum of the original message data, not including the header character. If the checksum results in a value equal to one of the protocol control characters, it will be treated in accordance with the function of the complement next byte character.

In the polling scheme described above, there are three different modes of communication over the link between the central processor and the receiver. First, the central processor may send messages intended for the receiver. Second, the central processor may send messages intended for the wireless gaming device. Third, the wireless gaming device may send messages intended for the central processor. In various embodiments, messages sent by the central processor may be in the form of a character string formatted with a header character, followed by the identification code of the intended device, the command or message, an end of message character, and a checksum character. Messages received by the receiver, or the wireless gaming device may be acknowledged by transmission of an acknowledgement character, but the central processor need not acknowledge messages sent from the wireless gaming devices. Messages sent by the central processor to be received by the wireless gaming device may be broadcast to all of the wireless gaming devices. A device address may be reserved as a broadcast address for all of the wireless gaming devices, and all devices will receive messages sent to this address; in this case, no acknowledgement need be returned from any of the wireless gaming devices.

Each command or message may begin with a command code to signal how the information contained in the message is to be used. Command codes for messages sent by the central processor to the receiver and the wireless gaming device include the following:

1. Send a device address list to the receiver;
2. Send account balance information to the addressed device;
3. Send command to disable the addressed device;
4. Send command to enable the addressed device.

In various embodiments, messages sent between the receiver and the wireless gaming device may be in the form of a character string formatted with a header character, followed by the identification code of the intended device, the current wager amount, the request, command or data, an end of message character, and a checksum character. Command codes for requests, commands and data sent between the receiver and the wireless gaming device include the following:

1. Read user identification;
2. Read device address;
3. Read balance register;
4. Read wager amount register;
5. Provide device status;
6. Write user identification;
7. Write device address;
8. Write balance register;
9. Write wager amount;
10. Perform self test.

These command codes may be used to program the device addresses and user identification information into the wireless gaming devices, as well as to initialize the device to the default state, i.e., the player's account balance of $0. The account balance register and the user identification may each comprise two characters, the least significant byte, and the most significant byte, allowing for the use a greater range of numbers for these values.

Various embodiments include methods by which the central processor communicates with a wireless gaming device. The central processor transmits a string of hexadecimal characters, including, e.g., a header character, followed by the device's identification code, followed by a request, command or data, followed by an end of message character, followed by a checksum character. After the central processor transmits the character string, the wireless gaming device receives the string, recognizes its identification code, and executes any instructions in the string. When the central processor sends an instruction to all wireless gaming devices simultaneously, all currently active devices receive and execute the instruction. The wireless gaming device does not send an acknowledgement message to the central processor, although the receiver may receive a transmission from the wireless gaming device that the instruction was received properly. The central processor also communicates with the receiver in a similar manner, except that the receiver may send an acknowledgement message to the central processor which includes the acknowledgement control protocol character.

Similarly, the wireless gaming device communicates with the receiver and the central processor using, e.g., hexadecimal character strings. The receiver regularly and periodically polls the active wireless gaming device for information requests or wagering requests. If the player has entered a request into the wireless gaming device since the last time the wireless gaming device was polled, then the player's request will be transmitted to the receiver.

Various embodiments include methods by which the wireless gaming device receives and relays player requests to the central processor. First, the player enters a request into the wireless gaming device using buttons or keys. The player then presses a button labeled, e.g., "enter" or "send," instructing the wireless gaming device to send the request the next time the receiver polls the wireless gaming device. When this button has been pressed, the red light of the bicolor LED is illuminated, thereby informing the player that the request is waiting to be sent. The request is converted into a hexadecimal character string, including, e.g., a header character, an identification code (or, alternatively, a separate identification string reserved for a specific player), the current wager amount, the player's request (e.g., to change the wager amount or to send a balance update), an end of message character, and a checksum character. The next time the receiver polls the device, the transmitter of the device transmits the character string to the receiver. When the wireless gaming device is polled by the receiver, the green light of bicolor LED flashes, informing the player that the request has been transmitted. The receiver receives the request string and transmits the string to the central processor. The central processor then acts on the player's request.

Using the terminal, the game official may process wagering transactions and distribute wireless gaming devices. In various embodiments, the terminal may include a bar code reader and/or a magnetic stripe reader for rapid entry of the identifier of a wireless gaming device prior to delivering the wireless gaming device to the player. Reading devices provide information in the form of digital data to the terminal. The terminal includes a keyboard by which the game official can manually enter data to be sent to the central processor. Using either reading device, the keyboard, or a combination of these, the game official communicates with the central processor to establish a player's account, increase the balance of the account when the player tenders funds to the game official, and decrease the balance of the account when the player seeks to collect the cash value of his account balance.

The player establishes a balance of the account associated with his wireless gaming device, identified by an identifier, when he receives the wireless gaming device from the game official. The player may increase the monetary value of the balance of the account by paying additional funds, in the form of cash or credit, to the game official, who accesses the account stored in the central processor through the terminal to increase the balance of the account.

The wireless gaming device is returned to the game official after the player has played one or more games. The readers may be used to read the identifier for closing out the player's account stored in the database of the central processor. The terminal includes a terminal display which notifies the game official of the balance of the player's account, so that the player may be paid the cash value of the remaining balance of his account.

In some embodiments, an account status display device is located in the gaming establishment to display players' account information. In various embodiments, the display device may be, e.g., a liquid crystal display or a cathode ray tube display. The display device is controlled by the central processor, which sends information to the display device for display to the players.

A player may look at the display device to confirm that wagers transmitted from the wireless gaming device were received by the receiver and sent to the central processor, to determine the monetary balance of the player's account, and to verify that the player's winnings have been credited to his account. The display device displays key information necessary for a player to participate in a game. The information displayed for each player may include the account number, the player's account balance, the player's last wager, and the player's last prize award or win.

The display device is divided into specific areas, e.g., a display area, each area showing the account information for one player. The size of the display area may be determined by the size of the display device and the number of players who possess wireless display devices. It is contemplated that only active accounts will be displayed on the display device. If additional display devices are required to display the information concerning a large number of accounts, the central processor may be configured to drive multiple similar display devices.

The display device may also be used to display the odds and payouts for game wagers. Alternately, a separate display device driven by the central processor may be used to display the odds and payout information. Further, the odds and payouts may be displayed on the device display 21.

Procedures for using the wireless interactive gaming system, according to some embodiments, are now described. In some embodiments, a player tenders money in the form of cash or credit, e.g., $100, to a game official in the gaming establishment to establish an account. The game official chooses a wireless gaming device and uses, e.g., the bar code reader on the terminal to enter the identifier of the wireless gaming device into the terminal. The game official also inputs the amount of money tendered, i.e. $100, into the terminal via keyboard. The game official hands the wireless gaming device to the player and tells the player that his account is, e.g., Account No. 12. Alternately, the player may identify his account number directly from the identifier on the wireless gaming device. The information entered by the game official into the terminal is sent to the central processor, which establishes an account record for the player in the database.

For this example, the central processor may be conducting a racing game in which players choose a winning racing element on which to place a wager for the next racing game to be displayed in the gaming establishment. To place a wager, the player presses buttons on the wireless gaming device.

In some embodiments, the player first presses the button that corresponds to the number assigned to the racing element that he chooses, e.g., "3", and then the wager amount, e.g., "$" and "5", for a $5 wager. The player then presses the "enter" key to transmit his wager to the central processor.

In an alternate embodiment, the game may be simplified so that all wagers are placed for a fixed amount, e.g., $1, by pressing a single button on the wireless gaming device. By pressing the button that corresponds to the number assigned to the chosen racing element, e.g., "3", the player places a $1 bet on racing element number 3. The player can then place a larger wager on racing element number 3, by pressing the "3" button the number of times corresponding to the number of $1 bets he desires to make, e.g., by pressing "3" five times to wager $5 on racing element number 3.

Each time the player enters a wager, the wireless gaming device forms a data packet containing the player's wager information and the identification code of the wireless gaming device. The data packet is encrypted and transmitted by the transmitter via wireless communication.

The decoder in the receiver receives the encrypted data packet transmitted by the transmitter. The encrypted data packet is sent to the central processor, where it is decrypted. The central processor uses the information it has obtained to update the player's account in the database by subtracting the wagered amount from the player's account balance and registers the player's wager on the game.

After the game has been played, the central processor awards prizes to winning players based on the wagers they have made, and the odds associated with the winning outcome of the game. If the player in possession of the wireless gaming device is a winner, the central computer updates the player's account in the database by adding the monetary amount of the prize to the player's account balance. Otherwise, the player's account remains unchanged.

When the player has finished playing games in the gaming establishment, he returns the wireless gaming device to the game official. The game official again inputs the identifier of the wireless gaming device into the terminal, e.g., by using the bar code reader of the terminal. The terminal accesses the player's account information stored in the database of the central processor to obtain the player's remaining account balance. The terminal display displays the player's remaining account balance to the game official, who then tenders the monetary value of that amount to the player. The account is closed, and the transaction is recorded in the central processor.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Hand-Held Wireless Game Player

Various embodiments include a hand-held wireless game player for playing a game of chance. The hand-held wireless game player may be generally characterized as including: 1) a wire-less communication interface; 2) a display screen; 3) one or more input mechanisms; and 4) a microprocessor configured i) to present the game of chance on the display screen using operating instructions received via the wireless communication interface from a master gaming controller located on a gaming machine and ii) to send information from input signals generated from the one or more input mechanisms to the master gaming controller via the wireless communication interface. The wireless game player may be played in a plurality of venue locations physically separate from the location of the gaming machine where the plurality of venue locations are selected from the group consisting of a keno parlor, a bingo parlor, a restaurant, a sports book, a bar, a hotel, a pool area, and a casino floor area. The game of chance played on the wireless game player may be selected from the group consisting of slot games, poker, pachinko, multiple hand poker games, pai-gow poker, blackjack, keno, bingo, roulette, craps, and a card game. Other games are also contemplated, in various embodiments.

In various embodiments, the wireless communication interface may use a wireless communication protocol selected from the group consisting of IEEE 802.11a, IEEE 802.11b, IEEE 802.11x, hyperlan/2, Bluetooth, and HomeRF. The wireless game player may also comprise a wire network interface for connecting the wireless game player to a wire network access point. In addition, the wireless game player may also comprise a peripheral interface for connecting to a peripheral gaming device where the peripheral interface is a serial interface, a parallel interface, a USB interface, a FireWire interface, an IEEE 1394 interface. The peripheral gaming device may be a printer, a card reader, a hard drive, and a CD-DVD drive.

In various embodiments, the one or more inputs mechanisms on the wireless game player may be selected from the group consisting of a touch screen, an input switch, an input button, and biometric input device where the biometric input device may be a fingerprint reader. The wireless game player may also include a detachable memory interface designed to receive a detachable memory where the detachable memory unit stores graphical programs for one or more games of chance played on the wireless game player. The wireless game player may also comprise one or more of the following: 1) an audio output interface for receiving a head phone jack, 2) an antenna, 3) a sound projection device, 4) a battery, 5) a power interface for supplying power to the wireless game player from an external power source and for charging the battery from the external power source, 6) a memory unit where the memory unit may store graphical programs for one or more games of chance played on the wireless game player, 7) an electronic key interface designed to receive an electronic key, and 8) a video graphics card for rendering images on the display screen where the video graphics card may be used to render 2-D graphics and 3-D graphics.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

INCORPORATION BY REFERENCE

The following are incorporated by reference herein:
U.S. Pat. No. 6,676,522;
U.S. Pat. No. 6,846,238;
U.S. Pat. No. 6,702,672.

The invention claimed is:

1. A mobile device, comprising:
a display screen;
a motion sensor configured to detect motion of the mobile device;
a controller configured to receive an activation by a user during operation of a gaming;
at least one processor to:
detect motion-sensitive input based on the detected motion by the motion sensor;
detect the activation of the controller by the user;
generate gambling commands based on motion signals from the motion sensor while the activation of the input by the user is detected;
disable the generation of the gaming commands in absence of the motion of the mobile device or the activation of the input by the user; and
wherein an amount of the detected motion determines a bet size placed during the gaming.

2. The mobile device of claim 1, wherein the at least one processor is further configured to: to prevent use of motion-controlled input of the mobile device for gambling for value, until completion of a calibration sequence of motion-controlled use of the mobile device for no value is detected, to ensure that motion input is reliable during subsequent play for value.

3. The mobile device of claim 1, wherein the at least one processor is further configured to:
automatically disabling the motion sensor after an expiration of a predetermined time period.

4. The mobile device of claim 1, wherein the at least one processor is further configured to:
automatically disabling the motion sensor when the motion sensor is lowered by a specific amount of height.

5. The mobile device of claim 1, further comprising a light sensor, wherein the at least one processor automatically disables the motion sensor when the light sensor no longer detects light.

6. The mobile device of claim 1, further comprising a heat sensor, wherein the at least one processor automatically disables the motion sensor when the heat sensor no longer detects body heat.

7. The mobile device of claim 1, wherein the at least one processor is further configured to:
display on the display screen of the mobile device, four gambling symbols representing gambling tokens, the four gambling symbols being displayed in four mutually-remote points of the display screen, the mobile device being part of a mobile gambling system for play of gambling games for value;
receive from the motion sensor a motion signal indicating motion in a direction of one of the four gambling symbols; and
generate a specific gambling command that is in accordance with the one of the four gambling commands.

8. The mobile device of claim 1, wherein the motion sensor comprises an accelerometer.

9. The mobile device of claim 1, wherein the motion sensor comprises a camera.

10. The mobile device of claim 1, wherein the motion sensor is designed to detect a location of the mobile device.

11. The mobile device of claim 1, wherein enablement of motion-sensitive input is designed to toggle when the controller detects the activation by the user.

12. The mobile device of claim 1, wherein a given gambling command includes one or more of:
(a) an instruction to place a bet;
(b) an instruction to place a bet of a certain amount;
(c) an instruction to begin a gambling game;
(d) an instruction to discard a card;
(e) an instruction to receive another card;
(f) an instruction to receive no further cards;
(g) an instruction to select an option in a bonus round;
(h) an instruction to cash out;
(i) an instruction to select a pay line; and
(j) an instruction to begin a bonus round.

13. A method comprising:
receiving, by at least one processor, signals from a motion sensor within a mobile device indicating motion of the mobile device;
receiving, by the at least one processor, signals from a controller indicating an activation of the controller by a user during gaming;
enabling, by the at least one processor, motion-sensitive input of gambling commands based on the signals from the motion sensor and the activation of the controller by the user; and
disabling, by the at least one processor, the motion-sensitive input in an absence of the motion of the mobile device or the activation of the controller is detected; and
permit, by the at least one processor, motion-controlled input of the mobile device for gambling for value, in response to the at least one processor detecting completion of a calibration sequence of motion-controlled use for no value of the mobile device.

14. The method of claim 13, further comprising:
displaying, by the at least one processor, on a display screen of the mobile device, four gambling symbols representing gambling tokens, the four gambling symbols being displayed in four mutually-remote points of the display screen;
receiving, by the at least one processor, from the motion sensor within the mobile device a motion signal indicating motion in a direction of one of the four gambling symbols; and
generating, by the at least one processor, a gambling command that is in accordance with the one of the four gambling commands.

15. The method of claim 13, further comprising:
translating, by the at least one processor, motion signals from the motion sensor into gambling control signals, and using, by the at least one processor, motion signals detected during calibration as training data for a translation process to adapt the mobile device to a particular user.

16. The method of claim 13, further comprising:

displaying, by the at least one processor, a message on a display screen of the mobile device, the message providing instructions to move the mobile device in a particular way in order to specify a motion in a calibration sequence.

17. The method of claim 13, further comprising:

testing, by the at least one processor, the motion signals before permitting use of the mobile device for gambling for value.

18. The method of claim 13, wherein a given gambling command includes one or more of:

(a) an instruction to place a bet;
(b) an instruction to place a bet of a certain amount;
(c) an instruction to begin a gambling game;
(d) an instruction to discard a card;
(e) an instruction to receive another card;
(f) an instruction to receive no further cards;
(g) an instruction to select an option in a bonus round;
(h) an instruction to cash out;
(i) an instruction to select a pay line; and
(j) an instruction to begin a bonus round.

* * * * *